United States Patent
Fukui

(10) Patent No.: US 9,621,656 B2
(45) Date of Patent: Apr. 11, 2017

(54) DISTRIBUTED DEPLOYMENT DEVICE AND METHOD

(71) Applicant: FUJITSU LIMITED, Kawasaki-shi, Kanagawa (JP)

(72) Inventor: Masayuki Fukui, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 14/540,598

(22) Filed: Nov. 13, 2014

(65) Prior Publication Data

US 2015/0142965 A1 May 21, 2015

(30) Foreign Application Priority Data

Nov. 18, 2013 (JP) .................. 2013-238128

(51) Int. Cl.
*H04L 12/26* (2006.01)
*H04L 29/08* (2006.01)

(52) U.S. Cl.
CPC .................... *H04L 67/12* (2013.01)

(58) Field of Classification Search
CPC ......... H04L 67/12; H04L 43/02; H04L 67/10; H04L 69/329; H06Q 10/10
See application file for complete search history.

(56) References Cited

U.S. PATENT DOCUMENTS

| | | | |
|---|---|---|---|
| 2006/0282498 A1 | 12/2006 | Muro | |
| 2007/0067742 A1* | 3/2007 | Takaoka | H04L 12/2602 715/850 |
| 2008/0098367 A1 | 4/2008 | Partridge et al. | |
| 2010/0030883 A1* | 2/2010 | Kiefer | H04L 12/24 709/223 |
| 2013/0232255 A1 | 9/2013 | Fukui et al. | |
| 2015/0131479 A1 | 5/2015 | Fukui | |

FOREIGN PATENT DOCUMENTS

| | | |
|---|---|---|
| JP | 6-195317 | 7/1994 |
| JP | 2006-344017 | 12/2006 |
| JP | 2008-97603 | 4/2008 |
| JP | 2013-20430 | 1/2013 |
| JP | 2013-47922 | 3/2013 |
| JP | 2013-175133 | 9/2013 |
| JP | 2015-095176 | 5/2015 |

* cited by examiner

*Primary Examiner* — Kim T Nguyen
(74) *Attorney, Agent, or Firm* — Fujitsu Patent Center

(57) ABSTRACT

A distributed deployment device that distributedly deploys a module to a node includes the configuration described below. The event collecting unit collects an event from a sensor network. The generation event information collecting unit collects a generation situation of the event in a node. The deployment destination determining unit determines a node of a deployment destination of the module in accordance with the generation situation of the event. The traffic reduction amount collecting unit collects a traffic reduction amount in the node in a case in which the distributed deployment of the module is controlled with respect to the node. The event collection cost calculating unit calculates a collection cost of the event from the node. The event information transmission interval control unit controls a transmission interval of the generation situation of the event in the node in accordance with the traffic reduction amount and the collection cost.

7 Claims, 27 Drawing Sheets

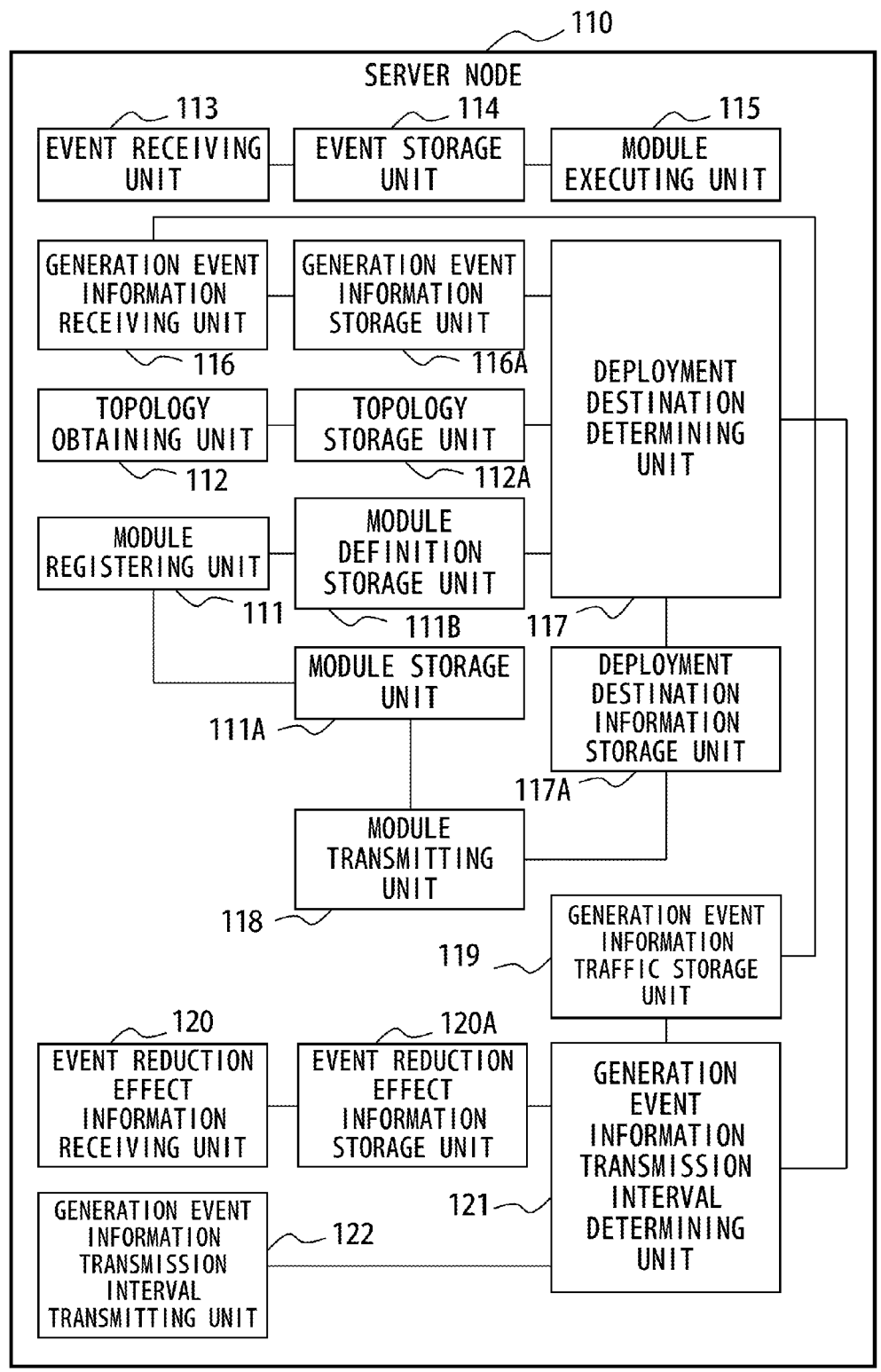
F I G. 2

| MODULE IDENTIFIER | BINARY CODE |
|---|---|
| POWER AMOUNT SUMMATION | BINARY DATA |

F I G. 3

| MODULE IDENTIFIER | INPUT EVENT TYPE | OUTPUT EVENT TYPE | AGGREGATION ATTRIBUTE NAME |
|---|---|---|---|
| POWER AMOUNT SUMMATION | POWER | POWER AMOUNT | USER ID |

FIG. 4

| LOWER NODE ID | UPPER NODE ID |
|---|---|
| POWER SENSOR X | CLOUD |
| POWER SENSOR Y | CLOUD |
| CLOUD | NIL |

F I G. 5

| EVENT TYPE | EVENT GENERATION TIME | EVENT ATTRIBUTE |
|---|---|---|
| POWER | 2013/8/1 12:00:00 | USER ID= "User-A" POWER VALUE=100 |
| POWER | 2013/8/1 12:00:01 | USER ID= "User-A" POWER VALUE=103 |
| POWER | 2013/8/1 12:00:02 | USER ID= "User-A" POWER VALUE=104 |
| ... | ... | ... |

F I G. 6

| GENERATION EVENT COLLECTION PERIOD | GENERATION NODE ID | GENERATION EVENT TYPE | GENERATION EVENT AGGREGATION ATTRIBUTE |
|---|---|---|---|
| 2013/8/1 12:00:00~12:01:00 | POWER SENSOR X | POWER | USER ID= "User-A" |
| 2013/8/1 12:01:00~12:02:00 | POWER SENSOR X | POWER | USER ID= "User-A" |
| 2013/8/1 12:02:00~12:03:00 | POWER SENSOR X | POWER | USER ID= "User-A" |
| 2013/8/1 12:03:00~12:04:00 | POWER SENSOR X | POWER | USER ID= "User-A" |
| 2013/8/1 12:04:00~12:05:00 | POWER SENSOR X | POWER | USER ID= "User-A" |
| 2013/8/1 12:05:00~12:06:00 | POWER SENSOR X | POWER | USER ID= "User-A" |
| 2013/8/1 12:06:00~12:07:00 | POWER SENSOR X | POWER | USER ID= "User-A" |
| 2013/8/1 12:07:00~12:08:00 | POWER SENSOR X | POWER | USER ID= "User-A" |
| 2013/8/1 12:08:00~12:09:00 | POWER SENSOR X | POWER | USER ID= "User-A" |
| 2013/8/1 12:09:00~12:10:00 | POWER SENSOR X | POWER | USER ID= "User-A" |
| 2013/8/1 12:10:00~12:11:00 | POWER SENSOR Y | POWER | USER ID= "User-A" |
| 2013/8/1 12:11:00~12:12:00 | POWER SENSOR Y | POWER | USER ID= "User-A" |
| 2013/8/1 12:12:00~12:13:00 | POWER SENSOR Y | POWER | USER ID= "User-A" |
| 2013/8/1 12:13:00~12:14:00 | POWER SENSOR Y | POWER | USER ID= "User-A" |
| 2013/8/1 12:14:00~12:15:00 | POWER SENSOR Y | POWER | USER ID= "User-A" |
| 2013/8/1 12:15:00~12:16:00 | POWER SENSOR Y | POWER | USER ID= "User-A" |
| 2013/8/1 12:16:00~12:17:00 | POWER SENSOR Y | POWER | USER ID= "User-A" |
| 2013/8/1 12:17:00~12:18:00 | POWER SENSOR Y | POWER | USER ID= "User-A" |
| 2013/8/1 12:18:00~12:19:00 | POWER SENSOR Y | POWER | USER ID= "User-A" |
| 2013/8/1 12:19:00~12:20:00 | POWER SENSOR Y | POWER | USER ID= "User-A" |

FIG. 7

| MODULE IDENTIFIER | INPUT EVENT TYPE | AGGREGATION ATTRIBUTE NAME | GENERATION EVENT ATTRIBUTE | GENERATION NODE ID | DEPLOYMENT DESTINATION NODE ID |
|---|---|---|---|---|---|
| POWER AMOUNT SUMMATION | POWER | USER ID | | | (UNDEPLOYED) |

F I G. 8

F I G. 9A

| MODULE IDENTIFIER | INPUT EVENT TYPE | AGGREGATION ATTRIBUTE NAME | GENERATION EVENT ATTRIBUTE | GENERATION NODE ID | DEPLOYMENT DESTINATION NODE ID |
|---|---|---|---|---|---|
| POWER AMOUNT SUMMATION | POWER | USER ID | USER ID= "User-A" | POWER SENSOR X | POWER SENSOR X |

F I G. 9B

| MODULE IDENTIFIER | INPUT EVENT TYPE | AGGREGATION ATTRIBUTE NAME | GENERATION EVENT ATTRIBUTE | GENERATION NODE ID | DEPLOYMENT DESTINATION NODE ID |
|---|---|---|---|---|---|
| POWER AMOUNT SUMMATION | POWER | USER ID | USER ID= "User-A" | POWER SENSOR Y | POWER SENSOR Y |

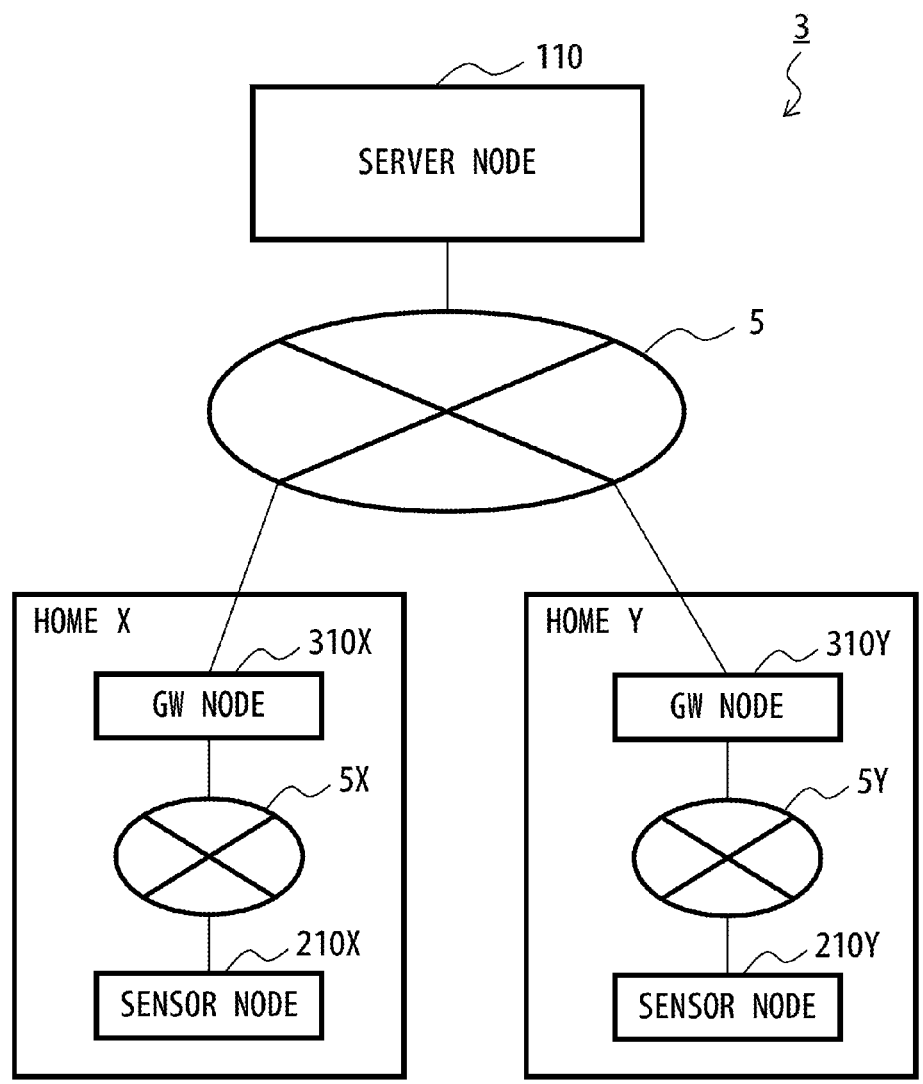
F I G. 10

| LOWER NODE ID | UPPER NODE ID |
|---|---|
| POWER SENSOR X | HOME GW-X |
| POWER SENSOR Y | MOBILE GW-Y |
| HOME GW-X | CLOUD |
| MOBILE GW-Y | CLOUD |
| CLOUD | NIL |

FIG. 11

| RECEPTION TIME | TRANSMISSION SOURCE NODE ID | RECEPTION DATA AMOUNT |
|---|---|---|
| 2013/8/1 12:01 | POWER SENSOR X | 100 BYTES |
| 2013/8/1 12:02 | POWER SENSOR X | 100 BYTES |
| ... | | |
| 2013/8/1 12:11 | POWER SENSOR Y | 100 BYTES |
| 2013/8/1 12:12 | POWER SENSOR Y | 100 BYTES |
| ... | | |
| 2013/8/1 12:21 | POWER SENSOR X | 100 BYTES |

FIG. 12

| PROCESS PERIOD | PROCESS NODE ID | PROCESS MODULE IDENTIFIER | INPUT EVENT DATA AMOUNT | OUTPUT EVENT DATA AMOUNT |
|---|---|---|---|---|
| 2013/8/1 12:00:00~12:01:00 | POWER SENSOR X | NIL | 6000 BYTES | 6000 BYTES |
| 2013/8/1 12:00:00~12:01:00 | POWER SENSOR Y | NIL | 0 BYTES | 0 BYTES |
| 2013/8/1 12:01:00~12:02:00 | POWER SENSOR X | POWER AMOUNT SUMMATION | 6000 BYTES | 100 BYTES |
| 2013/8/1 12:01:00~12:02:00 | POWER SENSOR Y | NIL | 0 BYTES | 0 BYTES |
| ... | ... | ... | ... | ... |
| 2013/8/1 12:09:00~12:10:00 | POWER SENSOR X | POWER AMOUNT SUMMATION | 6000 BYTES | 100 BYTES |
| 2013/8/1 12:09:00~12:10:00 | POWER SENSOR Y | NIL | 0 BYTES | 0 BYTES |
| 2013/8/1 12:10:00~12:11:00 | POWER SENSOR X | POWER AMOUNT SUMMATION | 6000 BYTES | 0 BYTES |
| 2013/8/1 12:10:00~12:11:00 | POWER SENSOR Y | NIL | 0 BYTES | 0 BYTES |
| 2013/8/1 12:11:00~12:12:00 | POWER SENSOR X | POWER AMOUNT SUMMATION | 6000 BYTES | 6000 BYTES |
| 2013/8/1 12:11:00~12:12:00 | POWER SENSOR Y | POWER AMOUNT SUMMATION | 6000 BYTES | 100 BYTES |
| ... | ... | ... | ... | ... |
| 2013/8/1 12:19:00~12:20:00 | POWER SENSOR X | POWER AMOUNT SUMMATION | 0 BYTES | 0 BYTES |
| 2013/8/1 12:19:00~12:20:00 | POWER SENSOR Y | POWER AMOUNT SUMMATION | 6000 BYTES | 100 BYTES |
| 2013/8/1 12:20:00~12:21:00 | POWER SENSOR X | POWER AMOUNT SUMMATION | 6000 BYTES | 100 BYTES |
| 2013/8/1 12:20:00~12:21:00 | POWER SENSOR Y | POWER AMOUNT SUMMATION | 6000 BYTES | 100 BYTES |
| 2013/8/1 12:21:00~12:22:00 | POWER SENSOR X | POWER AMOUNT SUMMATION | 6000 BYTES | 100 BYTES |
| 2013/8/1 12:21:00~12:22:00 | POWER SENSOR Y | POWER AMOUNT SUMMATION | 0 BYTES | 0 BYTES |

F I G. 1 3

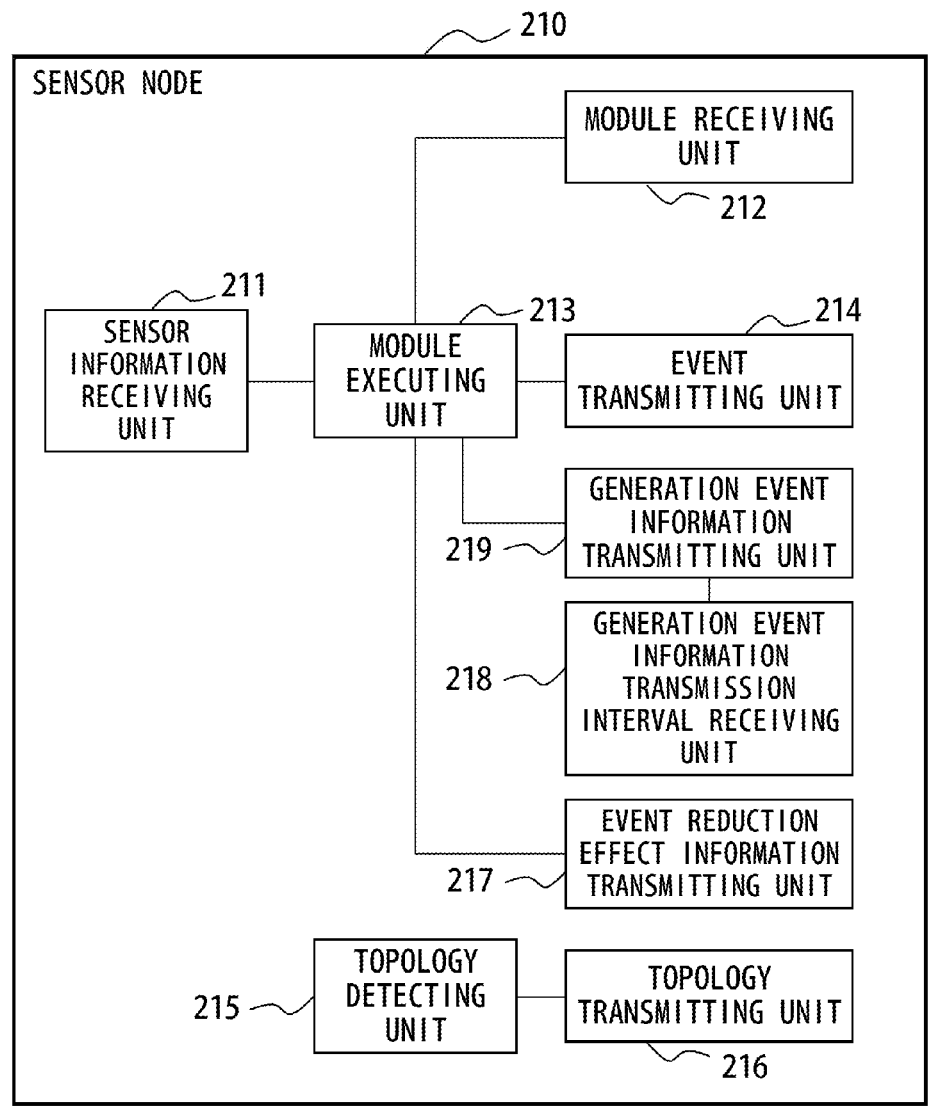
F I G. 1 4

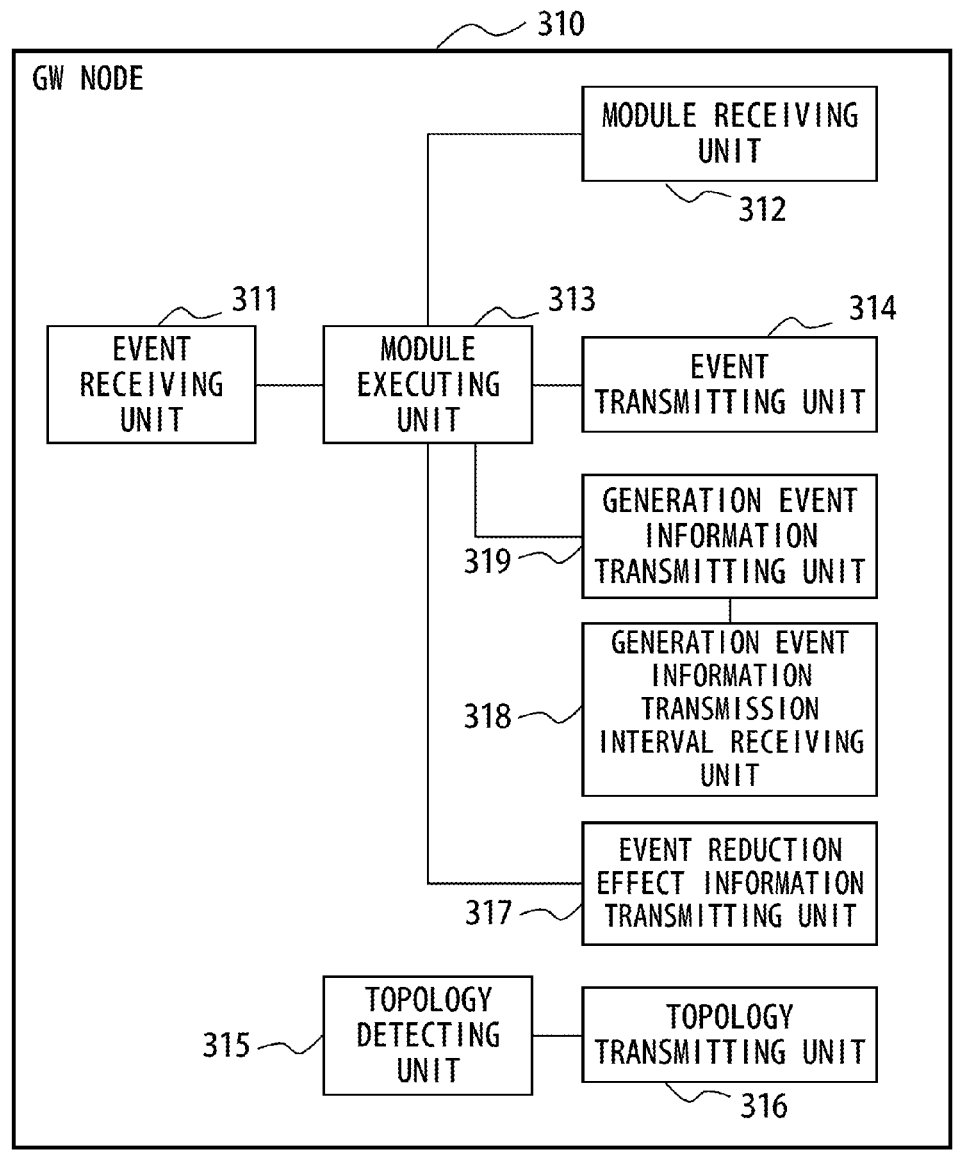
F I G. 1 5

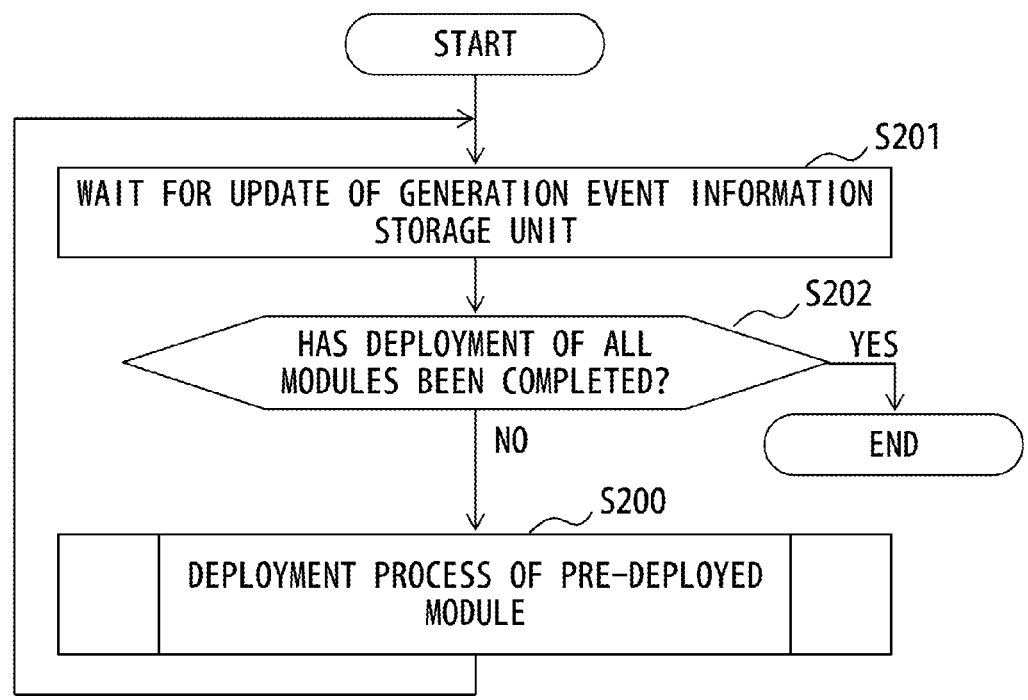
F I G. 17A

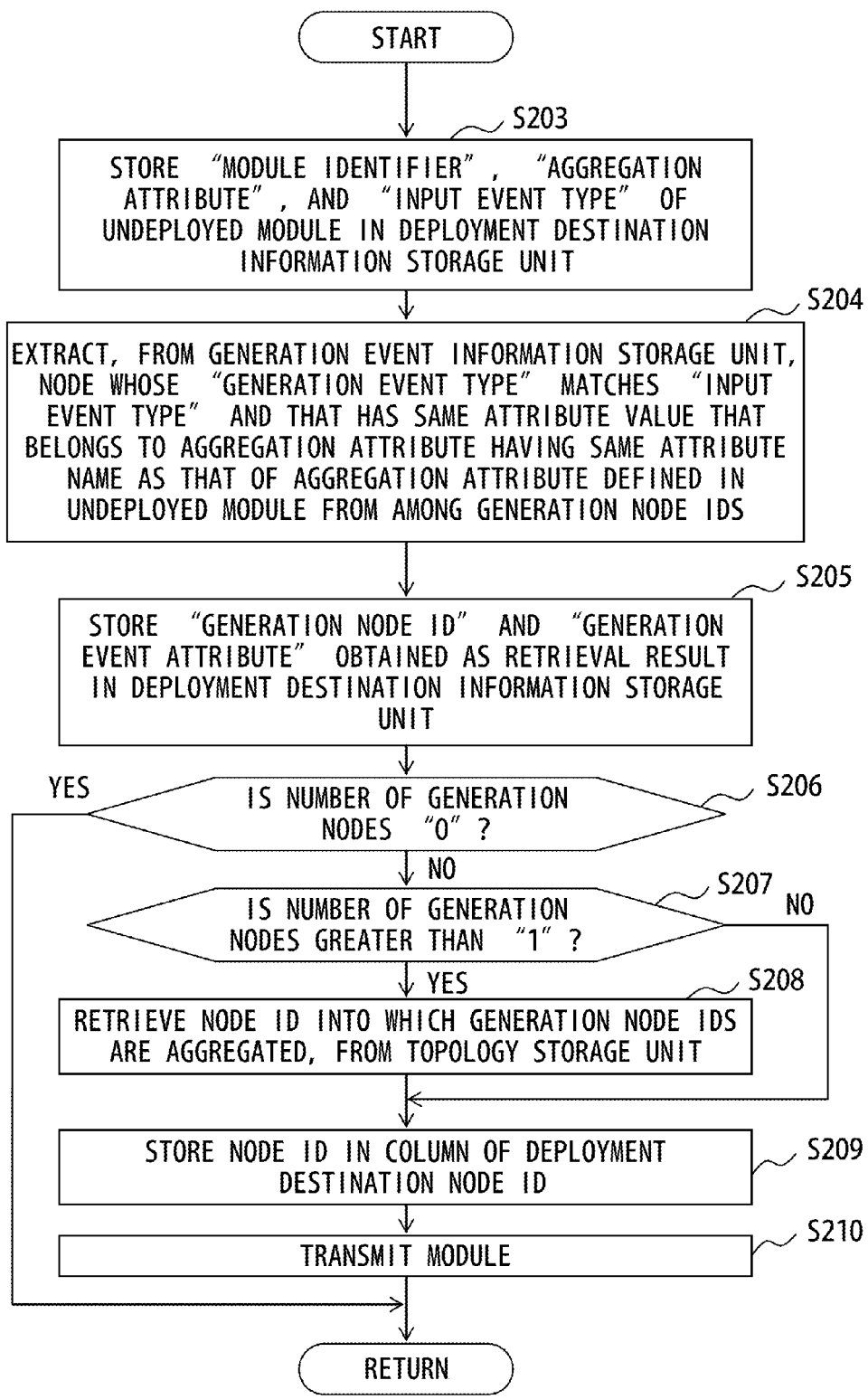
F I G. 17B

| GENERATION EVENT COLLECTION PERIOD | GENERATION NODE ID | GENERATION EVENT TYPE | GENERATION EVENT AGGREGATION ATTRIBUTE |
|---|---|---|---|
| 2013/8/1 12:00:00~12:02:00 | POWER SENSOR X | POWER | USER ID= "User-A" |
| 2013/8/1 12:02:00~12:04:00 | POWER SENSOR X | POWER | USER ID= "User-A" |
| 2013/8/1 12:03:00~12:04:00 | POWER SENSOR X | POWER | USER ID= "User-A" |
| 2013/8/1 12:04:00~12:06:00 | POWER SENSOR X | POWER | USER ID= "User-A" |
| 2013/8/1 12:06:00~12:08:00 | POWER SENSOR X | POWER | USER ID= "User-A" |
| 2013/8/1 12:08:00~12:10:00 | POWER SENSOR X | POWER | USER ID= "User-A" |
| 2013/8/1 12:10:00~12:12:00 | POWER SENSOR Y | POWER | USER ID= "User-A" |
| 2013/8/1 12:12:00~12:14:00 | POWER SENSOR Y | POWER | USER ID= "User-A" |
| 2013/8/1 12:14:00~12:16:00 | POWER SENSOR Y | POWER | USER ID= "User-A" |
| 2013/8/1 12:16:00~12:18:00 | POWER SENSOR Y | POWER | USER ID= "User-A" |
| 2013/8/1 12:18:00~12:20:00 | POWER SENSOR Y | POWER | USER ID= "User-A" |

FIG. 20

| RECEPTION TIME | TRANSMISSION SOURCE NODE ID | RECEPTION DATA AMOUNT |
|---|---|---|
| 2013/8/1 12:02 | POWER SENSOR X | 100 BYTES |
| 2013/8/1 12:04 | POWER SENSOR X | 100 BYTES |
| ... | ... | ... |
| 2013/8/1 12:12 | POWER SENSOR Y | 100 BYTES |
| 2013/8/1 12:14 | POWER SENSOR Y | 100 BYTES |
| ... | ... | ... |
| 2013/8/1 12:22 | POWER SENSOR X | 100 BYTES |

FIG. 21

| GENERATION EVENT COLLECTION PERIOD | GENERATION NODE ID | GENERATION EVENT TYPE | GENERATION EVENT AGGREGATION ATTRIBUTE |
|---|---|---|---|
| 2013/8/1 12:00:00~12:10:00 | POWER SENSOR X | POWER | USER ID= "User-A" |
| 2013/8/1 12:10:00~12:20:00 | POWER SENSOR Y | POWER | USER ID= "User-A" |

FIG. 22

| RECEPTION TIME | TRANSMISSION SOURCE NODE ID | RECEPTION DATA AMOUNT |
|---|---|---|
| 2013/8/1 12:10 | POWER SENSOR X | 100 BYTES |
| 2013/8/1 12:20 | POWER SENSOR Y | 100 BYTES |
| 2013/8/1 12:30 | POWER SENSOR X | 100 BYTES |

FIG. 23

| GENERATION EVENT COLLECTION PERIOD | GENERATION NODE ID | GENERATION EVENT TYPE | GENERATION EVENT AGGREGATION ATTRIBUTE |
|---|---|---|---|
| 2013/8/1 12:00:00~12:11:00 | POWER SENSOR X | POWER | USER ID= "User-A" |
| 2013/8/1 12:00:00~12:11:00 | POWER SENSOR Y | POWER | USER ID= "User-A" |
| 2013/8/1 12:11:00~12:22:00 | POWER SENSOR X | POWER | USER ID= "User-A" |
| 2013/8/1 12:11:00~12:22:00 | POWER SENSOR Y | POWER | USER ID= "User-A" |

F I G. 24

| PROCESS PERIOD | PROCESS NODE ID | PROCESS MODULE IDENTIFIER | INPUT EVENT DATA AMOUNT | OUTPUT EVENT DATA AMOUNT |
|---|---|---|---|---|
| 2013/8/1 12:00:00~12:01:00 | POWER SENSOR X | NIL | 6000 BYTES | 6000 BYTES |
| 2013/8/1 12:00:00~12:01:00 | POWER SENSOR Y | NIL | 0 BYTES | 0 BYTES |
| 2013/8/1 12:01:00~12:02:00 | POWER SENSOR X | POWER AMOUNT SUMMATION | 6000 BYTES | 6000 BYTES |
| 2013/8/1 12:01:00~12:02:00 | POWER SENSOR Y | NIL | 0 BYTES | 0 BYTES |
| ... | ... | ... | ... | ... |
| 2013/8/1 12:09:00~12:10:00 | POWER SENSOR X | POWER AMOUNT SUMMATION | 6000 BYTES | 6000 BYTES |
| 2013/8/1 12:09:00~12:10:00 | POWER SENSOR Y | NIL | 0 BYTES | 0 BYTES |
| 2013/8/1 12:10:00~12:11:00 | POWER SENSOR X | POWER AMOUNT SUMMATION | 6000 BYTES | 6000 BYTES |
| 2013/8/1 12:10:00~12:11:00 | POWER SENSOR Y | NIL | 0 BYTES | 0 BYTES |
| 2013/8/1 12:11:00~12:12:00 | POWER SENSOR X | POWER AMOUNT SUMMATION | 6000 BYTES | 6000 BYTES |
| 2013/8/1 12:11:00~12:12:00 | POWER SENSOR Y | POWER AMOUNT SUMMATION | 6000 BYTES | 6000 BYTES |
| ... | ... | ... | ... | ... |
| 2013/8/1 12:19:00~12:20:00 | POWER SENSOR X | POWER AMOUNT SUMMATION | 0 BYTES | 0 BYTES |
| 2013/8/1 12:19:00~12:20:00 | POWER SENSOR Y | POWER AMOUNT SUMMATION | 6000 BYTES | 6000 BYTES |
| 2013/8/1 12:20:00~12:21:00 | POWER SENSOR X | POWER AMOUNT SUMMATION | 0 BYTES | 0 BYTES |
| 2013/8/1 12:20:00~12:21:00 | POWER SENSOR Y | POWER AMOUNT SUMMATION | 6000 BYTES | 6000 BYTES |
| 2013/8/1 12:21:00~12:22:00 | POWER SENSOR X | POWER AMOUNT SUMMATION | 0 BYTES | 0 BYTES |
| 2013/8/1 12:21:00~12:22:00 | POWER SENSOR Y | POWER AMOUNT SUMMATION | 0 BYTES | 0 BYTES |

F I G. 2 5

| RECEPTION TIME | TRANSMISSION SOURCE NODE ID | RECEPTION DATA AMOUNT |
|---|---|---|
| 2013/8/1 12:11 | POWER SENSOR X | 6000 BYTES |
| 2013/8/1 12:11 | POWER SENSOR Y | 6000 BYTES |

FIG. 26

DISTRIBUTED DEPLOYMENT DEVICE AND METHOD

CROSS-REFERENCE TO RELATED APPLICATION

This application is based upon and claims the benefit of priority of the prior Japanese Patent Application No. 2013-238128, filed on Nov. 18, 2013, the entire contents of which are incorporated herein by reference.

FIELD

The embodiments discussed herein are related to a distributed deployment device that distributedly deploys a module that collects events, and a system, a non-transitory computer-readable recording medium having stored therein a program, and a method thereof.

BACKGROUND

A sensor network is known that collects sensing data sensed by a sensor node as an event. In accordance with the event collected in a server node via the sensor network, various services, such as the transmitting of alerts or the control of devices, are provided.

When events from the sensor node are collected in the server node as described above, all of the events are reported to the server node in a concentrated manner. Therefore, the load on the server node is increased, and a network band becomes tight as the network traffic is increased.

As a technology for suppressing the load on the server node and the network traffic as described above, the following conventional technology is known. In a distributed processing environment in which a plurality of network nodes connected to an actuator and a sensor are provided, the management node described below is included. The management node performs the arrangement control to the network nodes of various applications that enable minimizing network delay in the feedback control to the actuator based on interest determination elements stored in a table in a memory.

In addition, the conventional technology as described below is known. In a device on a processing performing side, an arrival request management unit monitors request data that arrives at a communication processing unit. When the arrival request management unit recognizes that the number of requests in the processing waiting state is equal to or greater than a preset number, the arrival request management unit determines another available and optimum device on the processing performing side based on information stored in another server state management unit, and transfers the requests to the another device. This enables determining a device on the processing performing side dynamically and automatically, causing an optimum device to perform processing while reflecting the state of each device on the processing performing side or the state of the load, and improving performance in the entire system (For example, Japanese Laid-open Patent Publication No. 2013-20430 or Japanese Laid-open Patent Publication No. 6-195317).

In these conventional technologies, distributed deployment (a distributed process) is performed based on the traffic reduction effect or the load on a processing device.

However, in the conventional technologies as described above, when an event generation situation is changed within a time interval during which an event log is evaluated, it enters into a state in which the same event occurs in a plurality of nodes during the same period, and the process can be performed only by a cloud in some cases. In the cases above, the conventional technologies above in which the distributed deployment or the like is performed simply based on the traffic reduction effect or the load on the processing device have a problem wherein it is impossible to perform efficient distributed deployment. Here, the change in the event generation situation means, for example, that a node in which an event occurs is changed.

On the other hand, in order to prevent the cases as described above, setting the time interval during which the event log is evaluated so as to be shortened in the conventional technologies as described above is considered. However, this coping method has a problem wherein only the collection cost of event logs is increased in a case in which the event generation situation is not changed. Here, that the event generation situation is not changed means, for example, that a node in which an event occurs is not changed.

SUMMARY

According to an aspect of the embodiments, a distributed deployment device that distributedly deploys a module that processes an event to a node includes an event collecting unit, a generation event information collecting unit, a deployment destination determining unit, a traffic reduction amount collecting unit, an event collection cost calculating unit, and an event information transmission interval control unit. The event collecting unit collects an event corresponding to a sensing operation from a sensor network to which a plurality of nodes including a sensor node that transmits the event are connected. The generation event information collecting unit collects a generation situation of the event in the node. The deployment destination determining unit determines a node of a deployment destination of the module in accordance with the generation situation of the event. The traffic reduction amount collecting unit collects a traffic reduction amount in the node in a case in which the control of the distributed deployment of the module is performed on the node. The event collection cost calculating unit calculates a collection cost of the event from the node. The event information transmission interval control unit controls a transmission interval of the event generation situation in the node in accordance with the traffic reduction amount collected by the traffic reduction amount collecting unit and the collection cost calculated by the event collection cost calculating unit.

The object and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIG. 2 is a block diagram of a server node according to the embodiments.

FIG. 3 illustrates an exemplary configuration of information stored in a module storage unit.

FIG. 4 illustrates an exemplary configuration of information stored in a module definition storage unit.

FIG. 5 illustrates an exemplary configuration of information stored in a topology storage unit.

FIG. 6 illustrates an exemplary configuration of information stored in an event storage unit.

FIG. 7 illustrates an exemplary configuration of information stored in a generation event information storage unit.

FIG. 8 illustrates an exemplary configuration of information stored in a deployment destination information storage unit.

FIGS. 9A and 9B illustrate a transition of a deployment situation from the deployment destination information storage unit illustrated in FIG. 8.

FIG. 10 illustrates an example of a topology change in the sensor network illustrated in FIG. 1.

FIG. 11 illustrates a transition of a topology from the topology storage unit illustrated in FIG. 5.

FIG. 12 illustrates an exemplary configuration of information stored in a generation event information traffic storage unit.

FIG. 13 illustrates an exemplary configuration of information stored in an event reduction effect information storage unit.

FIG. 14 is a block diagram of a sensor node according to the embodiments.

FIG. 15 is a block diagram of a GW node according to the embodiments.

FIG. 17A is a flowchart illustrating the procedure of a module deployment process based on the topology change according to the embodiments.

FIG. 17B is a flowchart illustrating the procedure of a deployment process of a pre-deployed module according to the embodiments.

FIG. 20 illustrates an example of a transition (at two-minute intervals) under a transmission interval control of the information stored in the generation event information storage unit.

FIG. 21 illustrates an example of a transition (at two-minute intervals) under a transmission interval control of the information stored in the generation event information traffic storage unit.

FIG. 22 illustrates an example of a transition (at ten-minute intervals) under the transmission interval control of the information stored in the generation event information storage unit.

FIG. 23 illustrates an example of a transition (at ten-minute intervals) under the transmission interval control of the information stored in the generation event information traffic storage unit.

FIG. 24 illustrates an example of a transition (at eleven-minute intervals) under the transmission interval control of the information stored in the generation event information storage unit.

FIG. 25 illustrates an example of a transition (at eleven-minute intervals) under a transmission interval control of the information stored in the event reduction effect information storage unit.

FIG. 26 illustrates an example of a transition (at eleven-minute intervals) under the transmission interval control of the information stored in the generation event information traffic storage unit.

DESCRIPTION OF EMBODIMENTS

Embodiments of a gateway device, a distributed deployment system event collection method, and an information processing device disclosed herein are described below in detail with reference to the drawings. The embodiments do not limit the technology disclosed herein. Further, the respective embodiments can be appropriately combined without causing any contradiction in the contents of processing.

Figure 1:
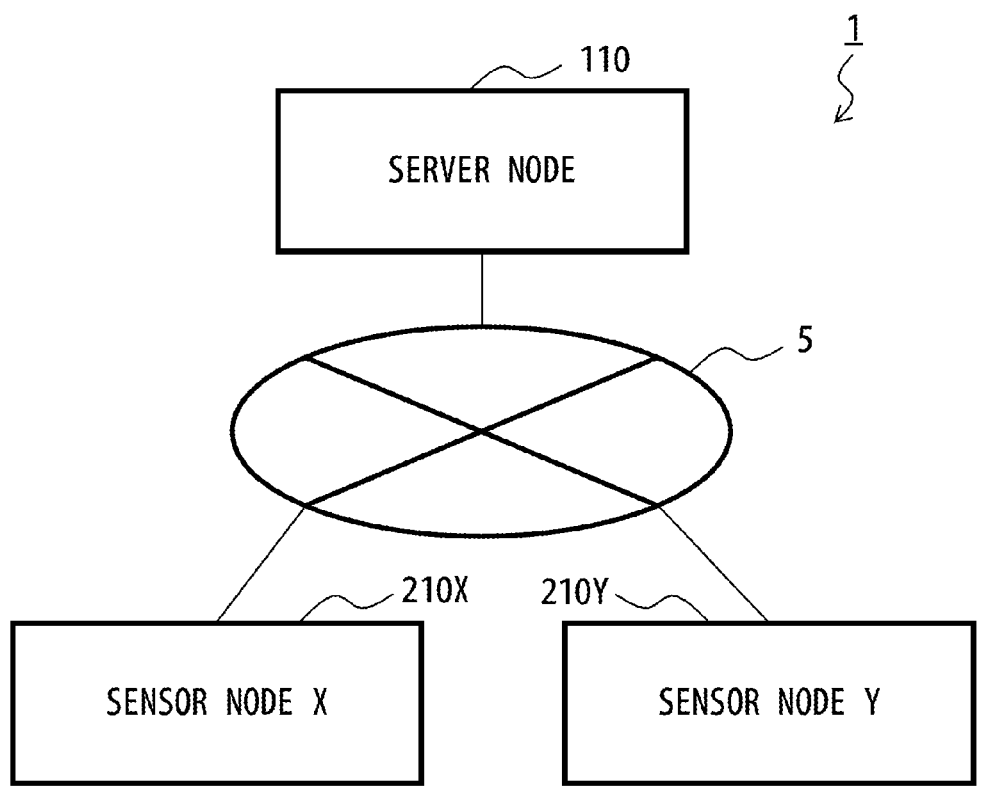
FIG. 1 illustrates a system configuration of a sensor network system according to the embodiments.

First, a system configuration of a sensor network system according to the embodiments is described. FIG. 1 illustrates the system configuration of the sensor network system according to the embodiments. A sensor network system 1 illustrated in FIG. 1 collects pieces of sensing data sensed by a sensor node 210 as events, and provides various services in accordance with the collected events.

As illustrated in FIG. 1, the sensor network system 1 accommodates a server node 110 and sensor nodes 210X and 210Y. In the example illustrated in FIG. 1, assume that pieces of event data are collected from the sensor node 210X and the sensor node 210Y to the server node 110. Hereinafter, when the sensor nodes 210X and 210Y are collectively referred to without distinction, they are sometimes referred to as "sensor nodes 210".

The sensor nodes 210 and the server node 110 are connected communicably via a network 5. An example of the network 5 is a communication network, such as the internet, a LAN (Local Area Network), or a VPN (Virtual Private Network), and it does not matter if it is a wired or wireless type. The example of FIG. 1 illustrates a case in which two sensor nodes 210 are accommodated; however, at least a plurality of sensor nodes may be accommodated, and this can be applied to a case in which an arbitrary number of sensor nodes are accommodated.

The sensor node 210 is a communication terminal with a sensor. The sensor node 210 includes various equipment, such as a household power tap receptacle, a personal computer and peripheral equipment thereof, an AV (Audio Visual) equipment, a portable terminal, such as a mobile phone or a PHS (Personal Handyphone System), or a home appliance. In addition, the sensor mounted on the sensor node 210 is an environment sensor, such as a power sensor that measures a power amount, a temperature sensor that measures temperature, a humidity sensor that measures humidity, or a temperature and humidity sensor that measures temperature and humidity. In the embodiments herein, a power sensor is given as an example of the sensor mounted on the sensor node 210. Alternatively, an arbitrary sensor, such as the environment sensor as described above, a GPS (Global Positioning System) sensor, an acceleration sensor, or a gyro sensor, may be mounted on the sensor node 210.

The server node 110 functions as a route node of the sensor network, and is a server device that provides various services in accordance with events. The server node 110 performs a distributed process on an event by deploying a module that performs processing of processing an event received from the sensor node 210 to a node located at a lower position than that of the local device. An event filtering process or aggregation process that is a trigger of a service-providing process that is performed by a service-providing application is incorporated into the module.

Here, the server node 110 according to the embodiments obtains a topology of the sensor network. Further, when the topology is changed, the server node 110 according to the embodiments obtains, from each node, a type of an event output by the node, and an attribute name and an attribute value of an aggregation attribute that aggregates a plurality of nodes including the node. Further, the server node 110 according to the embodiments extracts a node that outputs events of some types of plural types of events that a module uses as an input, and that has the same attribute value that belongs to an aggregation attribute having the same attribute name as that of an aggregation attribute defined in the module from among respective nodes. Further, when a plurality of nodes are extracted, the server node 110 according to the embodiments refers to the topology of the sensor network, and deploys the module to an upper node in which the respective nodes are accommodated.

Therefore, even when the topology of the sensor network is changed, the server node 110 according to the embodiments can distributedly deploy a module to a node on a lower side from which as much sensing data as possible is collected, from among nodes in which events aggregated by a module gather. Accordingly, the server node 110 according to the embodiments enables suppressing traffic of the sensor network as a result of appropriately deploying the module to the node on the sensor network. Further, the server node 110 according to the embodiments enables preventing loads from being concentrated on the server node 110 by distributedly deploying modules.

The example of FIG. 1 illustrates the sensor node 210 for a lower node of the server node 110, but as described later, a GW (gateway) node (FIG. 13) that relays the communication between the sensor node 210 and the server node 110 is included as the lower node of the server node 110 in some cases. Hereinafter, the sensor node 210 other than the server node 110 that is a route node or the GW node 310 as described below is sometimes referred to as a "lower node".

Described next is a functional configuration of the server node according to the embodiments. FIG. 2 is a block diagram of the server node 110 according to the embodiments. Assume that the server node 110 includes various function units included in a known server device, e.g., a function, such as various input devices or voice output devices, in addition to function units illustrated in FIG. 2.

As illustrated in FIG. 2, the server node 110 includes a module registering unit 111, a module storage unit 111A, a module definition storage unit 111B, a topology obtaining unit 112, and a topology storage unit 112A. Further, the server node 110 includes an event receiving unit 113, an event storage unit 114, a module executing unit 115, a generation event information receiving unit 116, and a generation event information storage unit 116A. Further, the server node 110 includes a deployment destination information storage unit 117A, a deployment destination determining unit 117, and a module transmitting unit 118. In addition, the server node 110 includes a generation event information traffic storage unit 119, an event reduction effect information receiving unit 120, an event reduction effect information storage unit 120A, a generation event information transmission interval determining unit 121, and a generation event information transmission interval transmitting unit 122.

The module registering unit 111 is a processing unit that registers modules. The module registering unit 111 receives the upload of a module that is programmed by, for example, a module developer so as to filter or aggregate events that are used as a trigger of various service-providing processes. As a result, the module registering unit 111 registers the module uploaded to the server node 110 in the module storage unit 111A as described below. Further, the module registering unit 111 receives a definition relating to the uploaded module via a terminal device used by the developer, and registers the received definition relating to the module in the module definition storage unit 111B as described below.

The module storage unit 111A is a storage unit that stores modules. When, for example, a module is uploaded to the module storage unit 111A, the module is registered by the module registering unit 111. Specifically, the module storage unit 111A stores data in which a module identifier and a binary code are associated. The "module identifier" in this example refers to an identifier for identifying a module. An identifier can be given to a module in accordance with a programming language used for the development, e.g., giving a function name to a module programmed in C, or giving a class name to a module programmed in the Java (registered trademark) language. In addition, the "binary code" refers to compiled binary data that becomes a module body.

FIG. 3 illustrates an exemplary configuration of information stored in the module storage unit 111A. The example in FIG. 3 illustrates an example in which one module identifier "power amount summation" is associated with its binary code. The "power amount summation" refers to a class name of a module that totalizes a power amount in each sensor node. When the module "power amount summation" is deployed to a lower node, events transmitted from the lower node to the server node 110 are aggregated.

The example in FIG. 3 illustrates a case of storing the binary code of the module, but the module does not always need to be stored in a binary format, and data in a format other than the binary format may be stored. For example, when the module is programmed in a script language, text data in which a script is described may be stored. Alternatively, a source code before being compiled may be stored. On this occasion, compiling is performed at the stage of deploying the module to a lower node, such as the sensor node 210, or the compiling is performed in the lower node, which is a deployment destination.

The module definition storage unit 111B is a storage unit that stores a definition relating to a module. When, for example, the definition relating to the module in addition to the module is uploaded to the module definition storage unit 111B, the definition of the module is registered by the module registering unit 111. The module definition storage unit 111B stores, for example, data in which the module identifier, an input event type, an output event type, and an aggregation attribute name are associated. The "input event type" refers to a type of an event that is used as an input of a process performed by the module. The "output event type" refers to a type of an event that is used as an output of the process performed by the module. The "aggregation attribute name" refers to a name of an aggregation attribute that is a frame that aggregates a plurality of nodes.

FIG. 4 illustrates an exemplary configuration of information stored in the module definition storage unit 111B. The example of the module "power amount summation" in FIG. 4 illustrates that a power event is input and a power amount event is output. In a case of the "power amount summation", a plurality of power events corresponding to the same user can be input in one process, and one power amount event corresponding to the user is output. Therefore, a user ID (user identifier) that identifies a user is given as the aggregation attribute name.

The topology obtaining unit 112 is a processing unit that obtains a connection state of the sensor network, i.e., a topology. The topology obtaining unit 112 obtains, from a lower node including, for example, the sensor node 210 or the GW node 310 as described below that are accommodated in the sensor network, connection information between nodes indicating which upper node the lower node is connected to. Then, the topology obtaining unit 112 registers the connection information between nodes that has been obtained from the lower node, in the topology storage unit 112A as described below. In the embodiments below, connection information is obtained that the lower node detects by automatically recognizing the upper node using a UPnP (Universal Plug and Play) protocol. In addition, connection information may be obtained that the server node 110 detects by recognizing a connection state with the lower node.

The topology storage unit 112A is a storage unit that stores a topology of the sensor network. When, for example, the connection information between nodes is obtained, the topology storage unit 112A registers, as a topology, the connection information between nodes that has been obtained by the topology obtaining unit 112. The topology storage unit 112A stores data in which a lower node ID and an upper node ID are associated. The "lower node ID" refers to an identifier that identifies a lower node. The "upper node ID" refers to an identifier that identifies an upper node connected to the lower node.

FIG. 5 illustrates an exemplary configuration of information stored in the topology storage unit 112A. In the example in FIG. 5, assume that the sensor node 210X illustrated in FIG. 1 is a power sensor X and that the sensor node 210Y is a power sensor Y. The example illustrated in FIG. 5 illustrates that all of the upper nodes of the power sensor X and the power sensor Y are the server node 110, which is a cloud, and that no relay nodes, such as the GW node 310, exist between the sensor nodes 210 and the server node 110.

In FIG. 2, the event receiving unit 113 and the event storage unit 114 form an event collecting unit.

The event receiving unit 113 is a processing unit that receives events. When the event receiving unit 113 receives an event from the lower node, such as the sensor node 210 or the GW node 310 as described below, the event receiving unit 113 stores the event in the event storage unit 114 as described below. The event receiving unit 113 does not always receive an unprocessed event that has been sensed by the sensor node 210, but in some cases, the event receiving unit 113 receives an event that has been processed by being processed by a module deployed to the lower node.

The event storage unit 114 is a storage unit that stores events. The event storage unit 114 is provided so that it can be referred to by a service-providing application that provides a service using a generation of an event as a trigger. For example, when an event is received from the lower node, the event is registered in the event storage unit 114 by the event receiving unit 113. In addition, for example, when an event is processed by a module, the processed event is registered in the event storage unit 114 by the module executing unit 115 as described below. The event storage unit 114 stores, for example, data in which an event type, an event generation time, and an event attribute are associated. The "event type" refers to an identifier that identifies a type of an event. The "event generation time" refers to a time when an event occurs, i.e., a time that has been sensed by the sensor node 210. The "event attribute" refers to a characteristic or origin of an event, e.g., a type of sensing data collected as an event or data generated by processing the event, or a set of attribute data, such as an aggregation attribute that aggregates a generation node in which an event occurs or a plurality of nodes including the generation node. The description below is given assuming a case in which each piece of attribute data included in the event attribute is configured so as to include a pair of the attribute name and the attribute value.

FIG. 6 illustrates an exemplary configuration of information stored in the event storage unit 114. A first record illustrated in FIG. 6 indicates an event in which the power value of the power user ID "User-A"=100 is measured at 12:00:00 on Aug. 1, 2013. A second record illustrated in FIG. 6 indicates an event in which the power value of the user ID "User-A"=103 is measured at 12:00:01 on Aug. 1, 2013. A third record illustrated in FIG. 6 indicates an event in which the power value of the user ID "User-A"=104 is measured at 12:00:02 on Aug. 1, 2013.

Not all of the events sensed on the lower node, such as the sensor node 210, need to be transferred, but only events that need a service-providing application may be transferred. As described above, the events stored in the event storage unit 114 are referred to by the service-providing application as a trigger for performing a service-providing process. The example in FIG. 6 illustrates an unprocessed event that has been sensed by the sensor node 210. Alternatively, when a module is deployed to a lower node and a service-providing application is needed, a new event that has been processed by the module may be transferred and stored.

The module executing unit 115 is a processing unit that performs an execution control on a module deployed to the server node 110. For example, when an event is received by the event receiving unit 113, the module executing unit 115 determines whether a module whose input event type is the received event has been deployed to the server node 110. When the module executing unit 115 determines that the module has been deployed to the server node 110, the module executing unit 115 processes the event by executing the module. Then, the module executing unit 115 stores data that has been processed by the module as a new event in the event storage unit 114.

The determination above is performed as the following. First, the module executing unit 115 refers to the module definition storage unit 111B illustrated in FIG. 4 so as to obtain a module identifier corresponding to the input event type of the received event. Next, the module executing unit 115 refers to the deployment destination information storage unit 117A illustrated in FIG. 8 as described below so as to obtain a deployment destination node ID corresponding to the input event type of the received event and the module identifier above. Then, the module executing unit 115 determines whether the deployment destination node ID is a node ID corresponding to the server node 110 so as to determine whether the module whose input event type is the received event has been deployed to the server node 110.

In FIG. 2, the generation event information receiving unit 116 and the generation event information receiving unit 116A form a generation event information collecting unit.

The generation event information receiving unit 116 is a processing unit that registers generation event information, which is information relating to an event that occurs in a lower node, such as the sensor node 210 or the GW node 310. The generation event information receiving unit 116 registers, for example, generation event information received from the lower node in the generation event information storage unit 116A. The generation event information storage unit 116A stores, for example, data in which a generation event collection period, a generation node ID, a generation event type, and a generation event aggregation attribute are associated. The "generation event collection period" refers to a period during which a generation event is collected in the lower node. The "generation node ID" refers to an identifier that identifies a generation node. The "generation event type" refers to an identifier that identifies a type of the generation event. The "generation event aggregation attribute" refers to an aggregation attribute at the time of collecting an event that has been used in the generation node.

FIG. 7 illustrates an exemplary configuration of information stored in the generation event information storage unit 116A. This example indicates that, in the power sensor X, an event in which the generation event type is "power" and the generation event aggregation attribute is 'user ID="User-A"' has occurred for one minute every minute from 12:00:00 to 12:09:00 on Aug. 1, 2013. This example also indicates that, in the power sensor Y, an event in which the generation event type is "power" and the generation event aggregation attribute is 'user ID="User-A"' has occurred for one minute every minute from 12:10:00 to 12:19:00 on Aug. 1, 2013.

In the embodiments, as described below, each of the sensor nodes 210 transmits generation event information at a generation event information transmission interval that is determined by the generation event information transmission interval determining unit 121 and that is transmitted by the generation event information transmission interval transmitting unit 122. Accordingly, a time interval of the generation event information stored in the generation event information storage unit 116A is variable.

The deployment destination information storage unit 117A is a storage unit that stores information relating to a deployment destination of a module. The deployment destination information storage unit 117A stores, for example, data in which a module identifier, an input event type, an aggregation attribute name, a generation event attribute, a generation node ID, and a deployment destination node ID are associated. The "deployment destination node ID" refers to an identifier that identifies the sensor node 210, the GW node 310 as described below, or the server node 110 to which a module is deployed.

FIG. 8 illustrates an exemplary configuration of information stored in the deployment destination information storage unit 117A. The example in FIG. 8 illustrates an example of a table at a stage at which a change is detected in the topology of the sensor network and the determination of a deployment destination of a module by the deployment destination determining unit 117 as described below is started. FIG. 8 illustrates an example of a table at a state at which the module identifier, the input event type, and the aggregation attribute name of all columns have been copied from the module definition storage unit 111B. A transition in which the remaining columns, such as the deployment destination node ID, are filled in is described below with reference to FIGS. 9A and 9B.

The deployment destination determining unit 117 is a processing unit that determines a deployment destination of a module. The deployment destination determining unit 117 performs the process described below, for example, when the topology storage unit 112A is updated, i.e., when the topology of the sensor network is changed, or when the generation event information storage unit 116A is updated. The deployment destination determining unit 117 writes pieces of column data of the module identifier, the input event type, and the aggregation attribute name in a module definition that has been stored in the module definition storage unit 111B as illustrated in FIG. 4, in corresponding columns of the deployment destination information storage unit 117A illustrated in FIG. 8. Here, in the deployment destination information storage unit 117A, the columns of the generation event attribute, the generation node ID, and the deployment destination node ID remain blank, as illustrated in FIG. 8.

The deployment destination determining unit 117 operates at a timing at which a topology stored in the topology storage unit 112A is changed, or at a timing at which the contents in the generation event information storage unit 116A are updated during the operation of the generation event information transmission interval determining unit described below.

The deployment destination determining unit 117 extracts a generation node ID of a generation node whose generation event type is included in the input event type of a pre-deployed module that is stored in the deployment destination information storage unit 117A, from among generation node IDs stored in the generation event information storage unit 116A. In the examples in FIG. 7 and FIG. 8, the deployment destination determining unit 117 operates at a timing at which the generation event information of a first record in FIG. 7 is registered in the generation event information storage unit 116A during the operation of, for example, the generation event information transmission interval determining unit 121 as described below. The deployment destination determining unit 117 extracts the generation node ID "power sensor X", which is included in the input event type "power" of a pre-deployed module in the deployment destination information storage unit 117 illustrated in FIG. 8, which has the module identifier "power amount summation".

Further, the deployment destination determining unit 117 extracts the following record from a group of records including the generation node ID extracted as described above, on the generation event information storage unit 116A. The deployment destination determining unit 117 extracts, from the group of records above, a record that has the same value of the generation event aggregation attribute that belongs to a generation event aggregation attribute having the same aggregation attribute name as that of the summation module stored in the deployment destination information storage unit 117A. In the examples in FIG. 7 and FIG. 8, a record in which the user ID is "User-A" is extracted from a group of records including, for example, "power sensor X" for the generation node ID that has been extracted as described above. At a timing at which the generation event information of the first record in FIG. 7 is registered in the generation event information storage unit 116A, only a first record has been registered, and therefore the first record is extracted.

Then, the deployment destination determining unit 117 writes the generation node ID obtained as an extraction result and the generation event aggregation attribute associated with the generation node ID in the column "generation node ID" and the column "generation event attribute" in the deployment destination information storage unit 117A. In the examples in FIG. 7 and FIG. 8, when the first record is extracted as described above, the writing as described below is performed. The generation node ID "power sensor X" and the generation event aggregation attribute '"user ID="User-A"' of the record are written in the column "generation node ID" and the column "generation event attribute" of the deployment destination information storage unit 117A, as illustrated in FIG. 9A.

On this occasion, the deployment destination determining unit 117 performs the following process when a plurality of generation node IDs are registered in the deployment destination information storage unit 117A. In other words, the deployment destination determining unit 117 extracts the following upper node ID of upper node IDs stored in the topology storage unit 112A. The deployment destination determining unit 117 extracts an upper node ID that has accommodated, as lower nodes, all of the sensor nodes 210 or the GW nodes 310 as described below that respectively correspond to the plural registered generation node IDs, and that is located at a lowest node side. The deployment destination determining unit 117 registers the upper node ID extracted as described above in respective columns of the deployment destination node ID of respective records in which the above respective generation node IDs have been registered in the deployment destination information storage unit 117A.

In addition, the deployment destination determining unit 117 has no choice about which node a module is deployed to when one generation node ID is registered in the deployment destination information storage unit 117A. Therefore, the deployment destination determining unit 117 registers the generation node ID that has been previously obtained as an extraction result, in the deployment destination node ID column of a record in which the generation node ID above has been registered in the deployment destination information storage unit 117A.

When the deployment destination node ID is registered in the deployment destination information storage unit 117A as described above, the module transmitting unit 118 performs a module transmission process. The module transmitting unit 118 is a processing unit that transmits a module to a lower node, such as the sensor node 210 or the GW node 310 as described below. The module transmitting unit 118 reads, from the module storage unit 111A, for example, a binary code of a module corresponding to a module identifier of a record in which the deployment destination node ID has been registered from among the records registered in the deployment destination information storage unit 117A. When the record is registered as illustrated in, for example, FIG. 9A, the module transmitting unit 118 reads, for example, a binary code of a module corresponding to the module identifier "power amount summation" of the record, from the module storage unit 111A illustrated in FIG. 3. Then, the module transmitting unit 118 transmits the read module to a node corresponding to the deployment destination node ID "power sensor X" of the record.

Then, the deployment destination determining unit 117 performs the following operation when the deployment destination determining unit 117 operates at a timing at which the contents of the generation event information storage unit 116A are updated during the operation of the generation event information transmission interval determining unit 121 as described below. The deployment destination determining unit 117 waits until the generation event information storage unit 116A is updated. When the generation event information storage unit 116A is updated, the deployment destination determining unit 117 performs the following operation. The deployment destination information storage unit 117A extracts, from the deployment destination information storage unit 117A, a record whose input event type and generation event attribute are respectively the same as the generation event type and the generation event aggregation attribute of a record of the updated generation event information storage unit 116A. Then, the deployment destination determining unit 117 determines whether a generation node ID of the record extracted on the deployment destination information storage unit 117A has been changed so as to be different from the generation node ID of the record of the updated generation event information storage unit 116A. When the deployment destination determining unit 117 determines that the generation node ID of the record extracted on the deployment destination information storage unit 117A has been changed, the deployment destination determining unit 117 deletes the record of the deployment destination information storage unit 117A in which the generation node ID has been changed, and sets the module to be a pre-deployed module. Then, the deployment destination determining unit 117 performs the module deployment process described above again on the module.

In the example of FIG. 7, a case is considered below in which, after a first record of the generation event information of 12:00:00-12:01:00 on Aug. 1, 2013 is registered, a next record of the generation event information of 12:01:00-12:02:00 on Aug. 1, 2013 is registered, and the generation event information storage unit 116A is updated. In this case, a generation node ID of the second record is the same as the generation node ID "power sensor X" of the first record. Accordingly, in this case, the deployment destination determining unit 117 does not delete the record in the deployment destination information storage unit 117A, as illustrated in FIG. 9A, and does not perform a new module deployment process. Until the generation event information of 12:09:00-12:10:00 on Aug. 1, 2013 is registered, the generation node ID is "power sensor X", and therefore the deployment destination determining unit 117 does not perform a new module deployment process.

Next, when the generation event information of 12:10:00-12:11:00 on Aug. 1, 2013 is registered, the generation node ID is changed to "power sensor Y". As a result, the deployment destination determining unit 117 extracts, from the deployment destination information storage unit 117A, a record whose input event type and generation event attribute are respectively the same as the generation event type and the generation event aggregation attribute of the updated record of the generation event. Specifically, the record as illustrated in FIG. 9A, in which the input event type is "power" and the generation event attribute is 'User ID="User-A"', is extracted. The generation node ID "power sensor X" of the record illustrated in FIG. 9A has been changed so as to be different from the generation node ID "power sensor Y" of the updated record of the generation event information. As a result, the deployment destination determining unit 117 deletes the record illustrated in FIG. 9A on the deployment destination information storage unit 117A in which the generation node ID has been changed, and sets the module to be a pre-deployed module. Then, the deployment destination determining unit 117 performs the module deployment process above again on the module. As a result, the deployment destination information illustrated in FIG. 9B in which the generation node ID and the deployment destination node ID have been changed is newly registered in the deployment destination information storage unit 117A.

When the deployment destination information of the deployment destination information storage unit 117A is updated as described above, the module transmitting unit 118 performs a transmission operation. The module transmitting unit 118 reads, from the module storage unit 111A, for example, a binary code of a module corresponding to the module identifier "power amount summation" of a record whose deployment destination ID has been newly registered in the deployment destination information storage unit 117A. Then, the module transmitting unit 118 transmits the read module to a node corresponding to the deployment destination node ID "power sensor Y" of the record.

On the other hand, when the deployment destination determining unit 117 operates in accordance with the change in the topology, the deployment destination determining unit 117 waits until a generation event that is newly obtained from a lower node as a result of the module deployment is updated in the generation event information storage unit 116A, and repeatedly performs the module deployment until no summation modules exist.

When no generation node IDs are registered in the deployment destination information storage unit 117A, there is a possibility that a generation event reported from the lower node has not finished being registered in the generation event information storage unit 116A. On this occasion, the deployment destination determining unit 117 waits until the generation event information storage unit 116A is updated, and repeatedly performs the module deployment.

Next, with reference to FIG. 10 and FIG. 11, a specific example of the module deployment based on a topology change is described. FIG. 10 illustrates an example of a topology change in the sensor network illustrated in FIG. 1. FIG. 11 illustrates a topology transition from the topology storage unit 112A as illustrated in FIG. 5.

A sensor network system 3 illustrated in FIG. 10 is different from the sensor network system 1 illustrated in FIG. 1 in that a GW node 310X is further added between the server node 110 and the sensor node 210X. Further, the sensor network system 3 is different in that a GW node 310Y is further added between the server node 110 and the sensor node 210Y. Hereinafter, assume a case in which the GW node 310X that is accommodated in, for example, a home X is a home gateway, and that the GW node 310Y that is accommodated in, for example, a home Y is a mobile gateway.

The sensor node 210X and the GW node 310X are communicably connected via, for example, a home network 5X. In addition, the sensor node 210Y and the GW node 310Y are communicably connected via, for example, a wireless LAN 5Y.

As described above, when the GW nodes 310X and 310Y are added, the topology of the sensor network is changed. In the example of FIG. 11, the power sensor X that is directly connected to the server node 110 that is a cloud in the example illustrated in FIG. 5 is changed into a connection state of being connected to the server node 110 via a home GW-X. Further, in the example of FIG. 11, the power sensor Y that is directly connected to the server node 110, a cloud, in the example illustrated in FIG. 5 is changed into a connection state of being connected via a mobile GW-Y. In the example of FIG. 11, assume a case in which the GW node 310X illustrated in FIG. 10 is the home GW-X that is accommodated in the home X, and the GW node 310Y is the mobile GW-Y that is accommodated in the home Y.

Then, as illustrated in FIG. 11, when the topology of the sensor network is changed, the module deployment setting that has been stored in the deployment destination information storage unit 117A illustrated in FIG. 9 is discarded, and a module is deployed again from a module deployment start state illustrated in FIG. 8.

The description returns to the configuration illustrated in FIG. 2. The generation event information traffic storage unit 119 forms an event collection cost calculating unit. The generation event information traffic storage unit 119 stores a traffic amount that occurs when the generation event information receiving unit 116 receives the generation event information from the sensor node 210 (FIG. 1). The generation event information traffic storage unit 119 stores, for example, data in which a reception time, a transmission destination node ID, and a reception data amount are associated.

FIG. 12 illustrates an exemplary configuration of information stored in the generation event information traffic storage unit 119. FIG. 12 illustrates that a reception data amount of 100 bytes is received from a transmission destination node ID of the power sensor X or the power sensor Y at every reception time.

As described above, the generation event information traffic storage unit 119 indicates a reception data amount at each reception time for each node indicated by the transmission destination node ID, i.e., a disadvantage that a collection cost is incurred for collecting generation events.

In FIG. 2, the event reduction effect information receiving unit 120 and the event reduction effect information storage unit 120A form a traffic reduction amount collecting unit.

The event reduction effect information receiving unit 120 receives, from the sensor node 210 (FIG. 1), information indicating an event reduction effect obtained by the process in the sensor node 210.

The event reduction effect information storage unit 120A stores the event reduction effect information received by the event reduction effect information receiving unit 120. The event reduction effect information storage unit 120A stores, for example, data in which a process period, a process node ID, a process module identifier, an input event data amount, and an output event data amount are associated.

FIG. 13 illustrates an exemplary configuration of information stored in the event reduction effect information storage unit 120A.

For example, a record in a first row indicates that, during a process period of 12:00:00-12:01:00 on Aug. 1, 2013, a process module is not deployed in the power sensor X because the process module identifier is "nil". In addition, the record indicates that the input event data amount in the power sensor X for this one minute is 600 bytes and that the output event data amount output from the power sensor X is also 6000 bytes. In other words, the record indicates that, at this point, the power sensor X outputs as is and as an output event an input event that has been input from a sensor that the power sensor X includes, without particularly performing summation or the like.

Next, for example, a record in a second row indicates that, during a process period of 12:00:00-12:01:00 on Aug. 1, 2013, a process module is not deployed in the power sensor Y because the process module identifier is "nil". The record also indicates that neither an input event nor an output event occurs in the power sensor Y for this one minute.

Further, for example, a record in a third row indicates that, during a process period of 12:01:00-12:02:00 on Aug. 1, 2013, a process module is deployed in the power sensor X because the process module identifier is "power amount summation". The record also indicates that, for this one minute, in the power sensor X, a summation process is performed on an input event data amount of 6000 bytes by the module "power amount summation" such that an output event data amount that is output from the power sensor X is aggregated into 100 bytes of the event "power amount" corresponding to the summation result.

It is indicated that the registration process advances, and that, for example, during a process period of 12:10:00-12:11:00 on Aug. 1, 2013, the input event data amount of 6000 bytes occurs in the power sensor Y. It is also indicated that, during this process period, a process module has not been deployed because the process module identifier is "nil". In addition, it is indicated that the input event data amount in the power sensor Y for this one minute is 6000 bytes and that the output event data amount that is output from the power sensor Y is 6000 bytes. In other words, it is indicated that, at this point, the power sensor Y outputs as is and as an output event an input event that has been input from a sensor that the power sensor Y includes, without particularly performing summation or the like.

A record in a previous row of the row described above indicates that, during a process period of 12:10:00-12:11:00 on Aug. 1, 2013, neither an input event nor an output event occurs in the power sensor X (the input event data amount and the output event data amount become 0 byte). This means, for example, that a user that has been using the power sensor X moves in order to use the power sensor Y.

Further, it is indicated that, during a process period of 12:11:00-12:12:00 on Aug. 1, 2013, in the power sensor Y, a process module is deployed because the process module identifier is "power amount summation". It is also indicated that, for this one minute, in the power sensor Y, a summation process is performed on the input event data amount of 6000 bytes by the module "power amount summation" such that the output event data amount that is output from the power sensor Y is aggregated into 100 bytes of the event "power amount" corresponding to the summation result above.

As described above, the event reduction effect information storage unit 120A indicates how much an output event data amount is reduced relative to the input event data amount during each process period for each node corresponding to a process node ID. In other words, the event reduction effect information storage unit 120A indicates an advantage obtained by a traffic reduction effect during each process period for each node.

The description returns to FIG. 2. The generation event information transmission interval determining unit 121 and the generation event information transmission interval transmitting unit 122 form an event information transmission interval control unit.

The generation event information transmission interval determining unit 121 determines, for each of the sensor nodes 210 (FIG. 1), a time interval (transmission interval) at which the sensor node 210 transmits generation event information. The generation event information transmission interval transmitting unit 122 determines the transmission interval based on the generation event information traffic storage unit 119 indicating the collection cost of generation events (disadvantage) and the event reduction effect information storage unit 120A indicating the traffic reduction effect (advantage).

The generation event information transmission interval transmitting unit 122 transmits, to the sensor nodes 210, the transmission intervals for the respective sensor nodes 210 that the generation event information transmission interval determining unit 121 has determined.

In the configuration of the server node 110 in FIG. 2 as described above, various integrated circuits or electronic circuits can be used for the module registering unit 111, the topology obtaining unit 112, the event receiving unit 113, the module executing unit 115, the generation event information receiving unit 116, the deployment destination determining unit 117, the module transmitting unit 118, the event reduction effect information receiving unit 120, the generation event information transmission interval determining unit 121, and the generation event information transmission interval transmitting unit 122. An example of the integrated circuit is a processor such as an ASIC (Application Specific Integrated Circuit). In addition, an example of the electronic circuit is a processor such as a CPU (Central Processing Unit) or an MPU (Micro Processing Unit).

In addition, a semiconductor memory device or a storage device is used for a storage unit, such as the module storage unit 111A, the module definition storage unit 111B, the topology storage unit 112A, the event storage unit 114, the generation event information storage unit 116A, the deployment destination information storage unit 117A, the generation event information traffic storage unit 119, and the event reduction effect information storage unit 120A, as described above. An example of the semiconductor memory device is a non-transitory computer-readable storage medium, such as a VRAM (Video Random Access Memory), a RAM (Random Access Memory), a ROM (Read Only Memory), or a flash memory. Further, an example of the storage device is a non-transitory computer-readable storage medium, such as a hard disk, an optical disk, or a CD-ROM (Compact Disc-ROM).

The computer-readable storage medium may store, for example, a distributed deployment program that causes a processor to function as the module registering unit 111, the topology obtaining unit 112, the event receiving unit 113, the module executing unit 115, the generation event information receiving unit 116, the deployment destination determining unit 117, the module transmitting unit 118, the event reduction effect information receiving unit 120, the generation event information transmission interval determining unit 121, and the generation event information transmission interval transmitting unit 122.

The server node 110 reads the distributed deployment program stored in the computer-readable storage medium into the RAM, for example, when a distributed deployment process is performed. Then, the server node 110 causes the processor to execute the distributed deployment program that has been read into the RAM so as to perform the distributed deployment process. The distributed deployment program may be stored in a computer-readable storage medium included in a server on the network.

Next, a functional configuration of the sensor node according to the embodiments is described. FIG. 14 is a block diagram illustrating a configuration of the sensor node 210 according to the embodiments. The sensor node 210 illustrated in FIG. 14 includes a sensor information receiving unit 211, a module receiving unit 212, a module executing unit 213, an event transmitting unit 214, a topology detecting unit 215, a topology transmitting unit 216, an event reduction effect information transmitting unit 217, a generation event information transmission interval receiving unit 218, and a generation event information transmitting unit 219.

The sensor information receiving unit 211 is a processing unit that receives sensor information from a sensor device that is incorporated into or attached to the sensor node 210. The sensor information receiving unit 211 receives power that is measured by a power sensor, for example, when the power sensor is incorporated into the sensor node 210. In addition, the sensor information receiving unit 211 receives temperature or humidity that is measured by a temperature sensor or a humidity sensor, for example, when the temperature sensor or the humidity sensor is incorporated into the sensor node 210. When a plurality of sensor devices are incorporated into the sensor node 210, a sensor information receiving unit 211 is provided which corresponds to each of the sensor devices.

The module receiving unit 212 is a processing unit that receives a module from the server node 110. The module received by the module receiving unit 212 is output to the module executing unit 213 that performs module execution control.

The module executing unit 213 is a processing unit that performs execution control of a module that has been deployed to the sensor node 210. For example, when the sensor information is received by the sensor information receiving unit 211, the module executing unit 213 determines whether a module whose input event type is the received sensor information has been deployed to the sensor node 210. When the module has been deployed to the sensor node 210, the module executing unit 213 performs processing on an event by executing the module. Then, the module executing unit 213 outputs data obtained by the processing by the module as a new generation event to the event transmitting unit 214. When the module has not been deployed to the sensor node 210, the sensor information is output to the event transmitting unit 214 without performing processing.

The event transmitting unit 214 is a processing unit that transmits an event to an upper node. The event transmitting unit 214 transmits, to the upper node, for example, an event that has been processed by the module executing unit 213, or the sensor information that has been received from the sensor device by the sensor information receiving unit 211. When the event transmitting unit 214 transmits the sensor information to the upper node, the event transmitting unit 214 adds, to the sensor information, a node ID of the sensor node 210, which is a generation node, and an attribute name and an attribute value of an aggregation attribute that aggregates a plurality of nodes including the local device. Then, the event transmitting unit transmits, to the upper node, an event including the node ID of the generation node and the aggregation attribute in addition to the sensor information.

Here, the attribute name and the attribute value of the above "aggregation attribute" can be incorporated into a device driver or the like at a stage of manufacturing the sensor node 210. For example, when the sensor device is a power sensor, the device driver is configured in advance to add an aggregation attribute, such as a "user ID" of a user that uses power, to the event. Then, at a stage at which a communication connection has been established between the sensor node 210 and the server node 110, the sensor node 210 can also automatically obtain, from the server node 110, an attribute value of the user ID that has been previously given to another sensor node 210 that has already subscribed to a service. In addition, when the sensor device is a temperature sensor, a humidity sensor, or a temperature and humidity sensor, the device driver is configured in advance to add an aggregation attribute, such as a "house ID", a "room ID", or a "floor ID", to an event. Then, at a stage at which a communication connection has been established between the sensor node 210 and the server node 110, the sensor node 210 can also automatically obtain, from the server node 110, an attribute value of the house ID that has been previously given to another sensor node 210 that has already subscribed to a service. When a room layout of an X house or a Y house, or the like, has been registered in the server node 110, an attribute value of an aggregation attribute, such as the "room ID" or the "floor ID", in addition to the "house ID", can also be automatically obtained from the server node 110.

The topology detecting unit 215 is a processing unit that detects connection information between nodes indicating which upper node the sensor node 210 is connected to, as a topology. The topology detecting unit 215 detects the topology by recognizing the GW node 310 that exists in the same local network as that of the sensor node 210, or by receiving a report on the existence of the GW node 310 from the server node 110, using, for example, UPnP protocol. The establishment of a network connection with the server node 110 can be realized by setting an address, such as a URL, of the server node 110.

The topology transmitting unit 216 is a processing unit that transmits the topology that has been detected by the topology detecting unit 215 to the server node 110. In an aspect of the embodiments, the topology transmitting unit 216 transmits to the server node 110 the node ID of the upper node to which the sensor node 210 is connected.

When an input event is processed by the module executing unit 213 and an output event of the processing result is generated, the event reduction effect information transmitting unit 217 transmits, to the server node 110, information indicating an effect in which an output event data amount is reduced with respect to the input event data amount. The information is collected in the event reduction effect information storage unit 120A as illustrated in FIG. 13 in the server node 110.

The generation event information transmission interval receiving unit 218 receives from the server node 110 information relating to a transmission interval of the generation event information for the local node.

The generation event information transmitting unit 219 transmits the generation event information to the server node 110 at the transmission interval that the generation event information transmission interval receiving unit 218 has received. The generation event is generated by collecting information relating to, for example, an input event to the module executing unit 213 and an output event that is a result of a process performed by the module executing unit 213. The information is collected in the generation event information storage unit 116A illustrated in FIG. 7 in the server node 110.

Next, a functional configuration of the GW node according to the embodiments is described. FIG. 15 is a block diagram illustrating the functional configuration of the GW node 310 according to the embodiments. The GW node 310 illustrated in FIG. 15 includes an event receiving unit 311, a module receiving unit 312, a module executing unit 313, an event transmitting unit 314, a topology detecting unit 315, a topology transmitting unit 316, an event reduction effect information transmitting unit 317, a generation event information transmission interval receiving unit 318, and a generation event information transmitting unit 319.

The event receiving unit 311 is a processing unit that receives events. In an aspect of the embodiments, the event receiving unit 311 receives events from the sensor node 210 or another GW node 310, which is a lower node.

The module receiving unit 312 is a processing unit that receives modules from the server node 110. The module received by the module receiving unit 312 is output to the module executing unit 313 that performs module execution control.

The module executing unit 313 performs the execution control of a module deployed to the GW node 310. For example, when an event is received by the event receiving unit 311, the module executing unit 313 determines whether a module whose input event type is the received event has been deployed to the GW node 310. When the module has been deployed to the GW node 310, the module executing unit 313 performs processing on the event by executing the module. Then, the module executing unit 313 outputs data generated as a result of the processing by the module, as a new generation event to the event transmitting unit 314. When the module has not been deployed to the GW node 310, the event is output to the event transmitting unit 314 without performing the processing.

The event transmitting unit 314 is a processing unit that transmits an event to an upper node. The event transmitting unit 314 transmits, for example, an event that has been processed by the module executing unit 313, or an event that has been received by the event receiving unit 311, to an upper node.

The topology detecting unit 315 is a processing unit that detects connection information between nodes indicating which upper node the GW node 310 is connected to, as a topology. The topology detecting unit 315 detects the topology by recognizing another GW node 310 that exists in the same local network as that of the GW node 310, or by receiving a report of the existence of another GW node 310 from the server node 110, using, for example, a UPnP protocol. The establishment of a network connection with the server node 110 can be realized by setting an address, such as a URL, of the server node 110.

The topology transmitting unit 316 is a processing unit that transmits the topology that has been detected by the topology detecting unit 315 to the server node 110. The topology transmitting unit 316 transmits to the server node 110, for example a node ID of an upper node to which the GW node 310 is connected.

When an input event is processed by the module executing unit 313 and an output event of the processing result is generated, the event reduction effect information transmitting unit 317 transmits, to the server node 110, information indicating an effect in which an output event data amount is reduced with respect to an input event data amount. The information is collected in the event reduction effect information storage unit 120A as illustrated in FIG. 13 in the server node 110.

The generation event information transmission interval receiving unit 318 receives, from the server node 110, information relating to a transmission interval of generation event information for the local node.

The generation event information transmitting unit 319 transmits the generation event information to the server node 110 at the transmission interval received by the generation event information transmission interval receiving unit 318. The generation event is generated by collecting, for example, information relating to an input event to the module executing unit 313 and an output event that is a result of a process by the module executing unit 313. The information is collected in the generation event information storage unit 116A as illustrated in FIG. 7 in the server node 110.

Next, a flow of a process of the sensor network system according to the embodiments is described. In the description below, the entire process performed by the sensor node 210 is first described, a module deployment process performed by the server node 110 is described, and a generation event information transmission interval reception process is further described.

Figure 16:
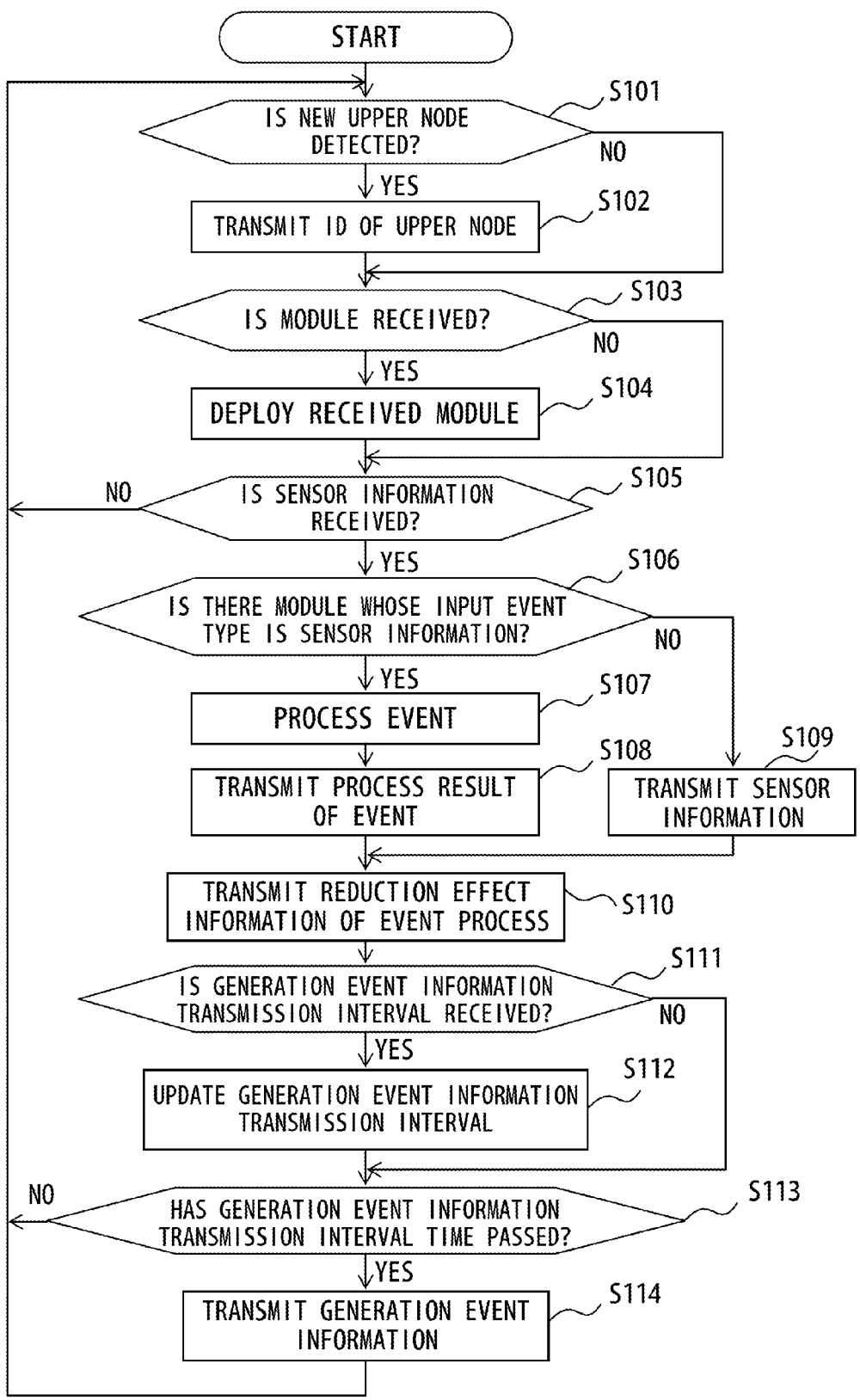
FIG. 16 is a flowchart illustrating the procedure of the entire process in the sensor node according to the embodiments.

FIG. 16 is a flowchart illustrating the procedure of the entire process in the sensor node 210 according to the embodiments. The entire process is repeatedly performed as long as a power source of the sensor node 210 is in an ON state.

As illustrated in FIG. 16, when a new upper node is detected (YES in the determination of step S101), the sensor node 210 transmits a node ID of the upper node to the server node 110 (step S102). When a new upper node is not detected (NO in the determination of step S101), a process of step S102 is not performed, and the process moves on to a process of step S103.

Next, when a module is received from the server node 110 (YES in the determination of step S103), the sensor node 210 deploys the module received from the server node 110 (step S104). When a module is not received (NO in the determination of step S103), a process of step S104 is not performed, and the process moves on to a process of step S105.

Then, when the sensor information is received from the sensor device (YES in the determination of step S105), the sensor node 210 further determines whether a module whose input event type is the sensor information has been deployed (step S106). When the sensor information is not received (NO in the determination of step S105), the process moves on to a process of step S101.

When the module has been deployed (YES in the determination of step S106), the sensor node 210 performs processing on the event by executing the module (step S107). Then, the sensor node 210 transmits the event on which the processing has been performed to an upper node (step S108).

On the other hand, when the module has not been deployed (NO in the determination of step S106), the sensor node 210 adds a generation node ID, an aggregation attribute, or the like, to the sensor information received from the sensor device, and transmits the sensor information to the upper node (step S109).

After the process of step S108 or S109, the sensor node 210 transmits reduction effect information of the event process to the upper node (step S110).

Next, when the generation event information transmission interval is received from the server node 110 (YES in the determination of step S111), the sensor node 210 updates a register that stores a transmission interval of the generation event information in the local device, or the like (step S112). When the generation event information transmission interval is not received (NO in the determination of step S111), the process moves on to a process of step S113.

When a time period of the generation event information transmission interval stored in the register above, or the like, passes (YES in the determination of step S113), the sensor node 210 transmits the generation event information to the upper node (step S114). After the process of step S114 is performed or when the time period described above has not passed (NO in the determination of step S113), the process returns to the process of step S101.

As described above, the sensor node 210 repeatedly performs the processes above of step S101 to step S114 until the power source enters into an OFF state.

The entire process in the sensor node 210 has been described above. The entire process performed by the GW node 310, which is a relay node is similar except for a portion. Specifically, the entire process in the GW node 310 is similar to the entire process in the sensor node 210 except that an event is received in the above step S105, instead of the sensor information.

Described next is a module deployment process based on a topology change according to the embodiments. FIG. 17A is a flowchart illustrating the procedure of the module deployment process based on the topology change according to the embodiments. The module deployment process is started when a topology of the sensor network is changed.

As illustrated in FIG. 17A, the server node 110 waits until the generation event information storage unit 116A is updated (step S201).

When the generation event information storage unit 116A is updated, it is determined whether the deployment of all of the modules is finished (step S202). In this example, because the process has not been finished on any of the modules (NO in the determination of step S202), the process proceeds to the deployment process of a pre-deployed module in step S200.

FIG. 17B is a flowchart which is invoked as step S200 in FIG. 17A illustrating the procedure of the deployment process of the summation module according to the embodiments.

First, the server node 110 stores pieces of column data of a module identifier, an input event type, and an aggregation attribute name in a module definition stored in the module definition storage unit 111B, in corresponding columns in the deployment destination information storage unit 117A (step S203).

After the server node 110 performs a process of step S203, the server node 110 performs a process of step S204 as described below. Specifically, the server node 110 extracts a generation node ID whose generation event type is included in an input event type of the summation module that has been stored in the deployment destination information storage unit 117A from among generation node IDs that have been stored in the generation event information storage unit 116A. Further, the server node 110 extracts the following record from a group of records including the generation node ID extracted as described above, on the generation event information storage unit 116A. The server node 110 extracts, from the group of records above, a record that has the same value of a generation event aggregation attribute belonging to a generation event aggregation attribute having the same aggregation attribute name as that of the summation module stored in the deployment destination information storage unit 117A.

Then, the server node 110 respectively writes the generation node ID obtained as an extraction result and the generation event attribute associated with the generation node ID into the column "generation node ID" and the column "generation event attribute" in the deployment destination information storage unit 117A (step S205).

Here, when the number of generation node IDs is "0" (YES in the determination of step S206), there is a possibility that a generation event reported from the lower node has not finished being registered in the generation event information storage unit 116A. In this case, the process proceeds to the process of step S202.

When there are a plurality of generation node IDs (YES in the determination of step S207), a process of step S208 as described below is performed. Specifically, the server node 110 extracts a node ID of a node that accommodates all of the sensor nodes 210 or the GW nodes 310 corresponding to each of the generation node IDs as lower nodes and that is located at the lowest node side, from among the upper node IDs stored in the topology storage unit 112A. Then, the server node 110 registers the node ID extracted as described above in the column of the deployment destination node ID (step S209).

In addition, when there is one generation node ID (NO in the determination of step S207), the server node 110 registers the generation node ID obtained as the extraction result in the column of the deployment destination node ID because there is no choice about which node a module is deployed to (step S209).

Next, the server node 110 transmits the module stored in the module storage unit 111A to a node corresponding to the deployment destination node ID (step S210). More specifically, as described with reference to FIG. 9, the server node 110 reads, from the module storage unit 111A, for example, a binary code of a module corresponding to a module identifier of a record in which a deployment destination node ID has been registered from among records that have been registered in the deployment destination information storage unit 117A. Then, the module transmitting unit 118 transmits the read module to a node corresponding to the deployment destination node ID of the record.

Then, the server node 110 returns to the waiting process of step S201 of FIG. 17A.

The server node 110 waits until the generation event information storage unit 116A is updated (step S201), and repeatedly performs the deployment process of a pre-deployed module in the above step S200 until the deployment of all of the modules is finished (NO in the determination of step S202). When the deployment of all of the modules is finished (YES in the determination of step S202), the process is finished.

As described above, the server node 110 according to the embodiments enables distributedly deploying a module to a node on a lower side from which as much sensing data as possible is collected from among nodes in which events aggregated by the module gather, even when a topology of the sensor network is changed. Accordingly, the server node 110 according to the embodiments enables suppressing of traffic of the sensor network as a result of the appropriate deployment of a module to a node on the sensor network. Further, the server node 110 according to the embodiments enables preventing the loads from concentrating on the server node 110 because modules are distributedly deployed.

In addition, the server node 110 according to the embodiments deploys the corresponding module to a lowest node from among upper nodes in which respective nodes are accommodated. As a result, the server node 110 according to the embodiments enables deploying a module to a node that is closest to a generation node of an event from among nodes in which events collected by the module gather. Therefore, the server node 110 according to the embodiments enables appropriately performing the module distributed deployment.

Figure 18:
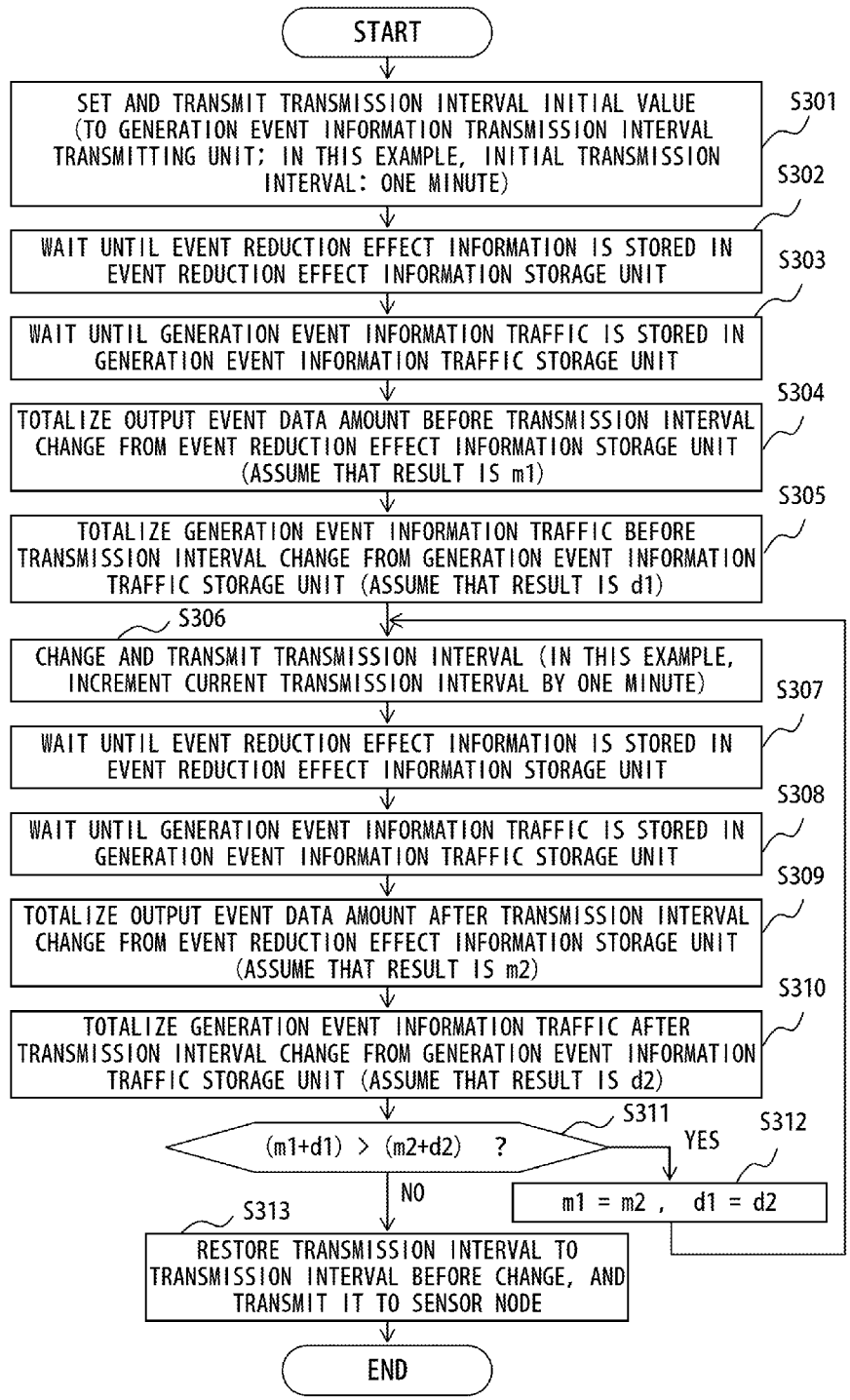
FIG. 18 is a flowchart illustrating the procedure of a generation event information transmission interval determination process according to the embodiments.

FIG. 18 is a flowchart illustrating the procedure of a generation event information transmission interval determining process according to the embodiments.

The server node 110 sets an initial value in a generation event information transmission interval, and transmits the value to each of the sensor nodes 210 (step S301). The initial value is, for example, one minute.

The server node 110 waits until event reduction effect information is stored in the event reduction effect information storage unit 120A (step S302).

The server node 110 waits until generation event information traffic is stored in the generation event information traffic storage unit 119 (step S303).

Then, the server node 110 totalizes an output event data amount before a change in the transmission interval from the event reduction effect information storage unit 120A (step S304). Assume that the summation result is m1.

The server node 110 totalizes the generation event information traffic before the change in the transmission interval from the generation event information traffic storage unit 119 (step S305). Assume that the summation result is d1.

A series of processes of step S306 to S312 as described below is repeatedly performed every time the transmission interval is changed.

First, the server node 110 changes the generation event information transmission interval, and transmits the value to the sensor node 210 (step S306). For example, one minute is added to a current value of the generation event information transmission interval.

The server node 110 waits until event reduction effect information is stored in the event reduction effect information storage unit 120A (step S307).

The server node 110 waits until the generation event information traffic is stored in the generation event information traffic storage unit 119 (step S308).

Then, the server node 110 totalizes an output event data amount after the change in the transmission interval from the event reduction effect information storage unit 120A (step S309). Assume that the summation result is m2.

The server node 110 totalizes the generation event information traffic after the change in the transmission interval from the generation event information traffic storage unit 119 (step S310). Assume that the summation result is d2.

The server node 110 determines whether the value of (m1+d1) is greater than the value of (m2+d2) (step S311).

When the determination of step S311 is YES, the server node 110 substitutes the value of m2 for m1, and substitutes the value of d2 for d1 (step S312). Then, the process is returned to step S306, and is repeated.

When the determination of step S311 is NO, the server node 110 restores the generation event information transmission interval to the value before the change, determines the generation event information transmission interval, and transmits the value to the sensor node 210 (step S313). Then, the server node 110 finishes the generation event information transmission interval determination process.

Figure 19:
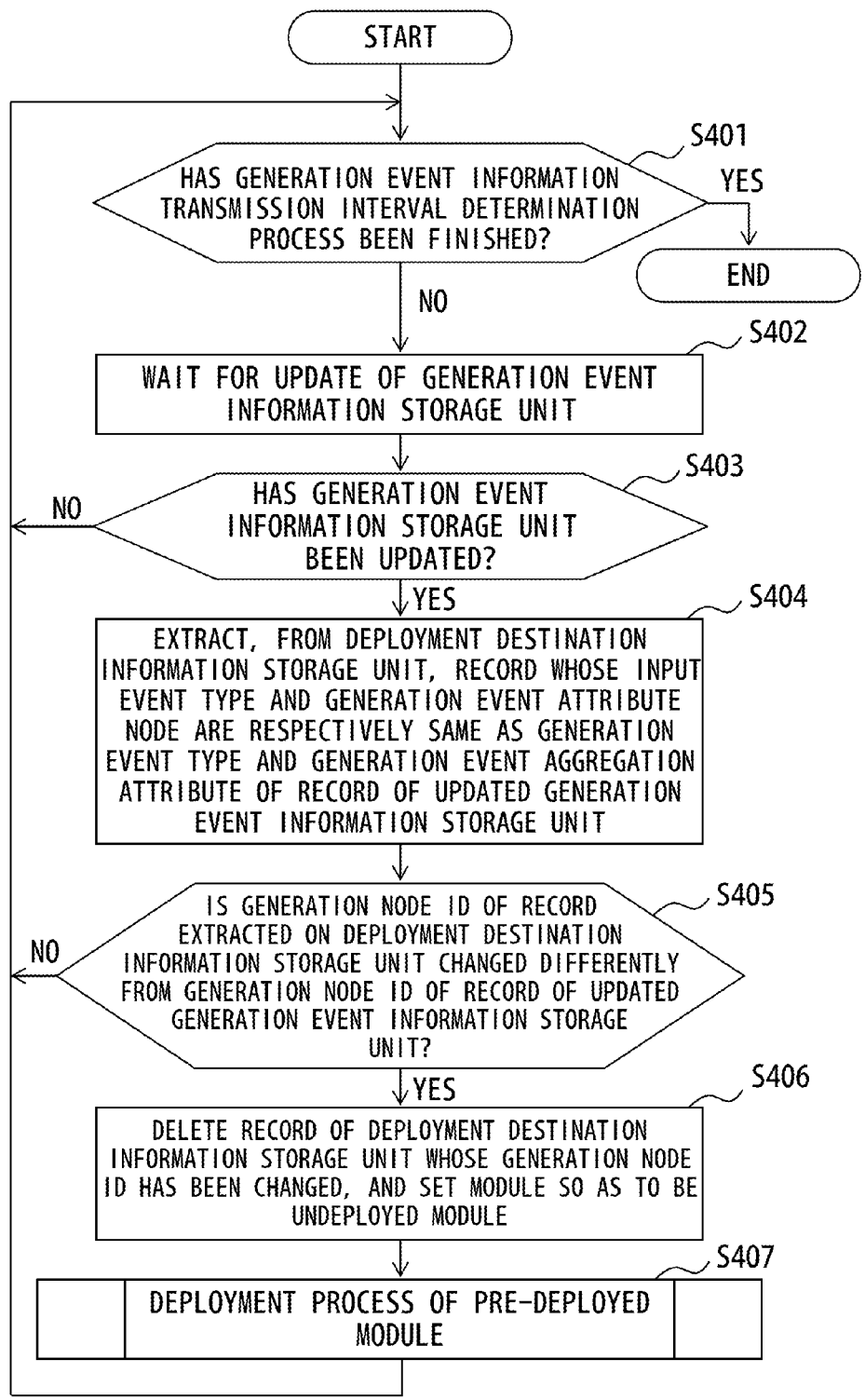
FIG. 19 is a flowchart illustrating the procedure of a module deployment process performed at the same time as the generation event information transmission interval determination process.

FIG. 19 is a flowchart illustrating the procedure of a module deployment process performed together with the generation event information transmission interval determination process in FIG. 18.

First, the server node 110 determines whether the generation event information transmission interval determination process has been finished (step S401).

When the determination of step S401 is NO, the server node 110 waits during a prescribed time period until the generation event information storage unit 116A is updated (step S402).

After the waiting of step S402, the server node 110 determines whether the generation event information storage unit 116A has been updated (step S403).

When the determination of step S403 is NO, the process is returned to a process of step S401.

When the generation event information storage unit 116A is updated and the determination of step S403 is YES, the server node 110 performs the following operation.

First, the server node 110 extracts, from the deployment destination information storage unit 117A, a record whose input event type and generation event attribute are respectively the same as a generation event type and a generation event aggregation attribute of a record in the updated generation event information storage unit 116A (step S404).

Next, the server node 110 determines whether a generation node ID of the record extracted on the deployment destination information storage unit 117A is changed differently from a generation node ID of the record in the updated generation event information storage unit 116A as described above (step S405).

When the determination of step S405 is NO, the process is returned to the process of step S401.

When the change occurs and the determination of step S405 is YES, the server node 110 deletes the record in the deployment destination information storage unit 117A whose generation node ID has been changed, and sets the module to be a pre-deployed module (step S406).

Then, the server node 110 performs a deployment process of a pre-deployed module on the summation module again (step S407). The deployment process is similar to the process in FIG. 17B as described above. As a result of this process, a module is deployed again to a new generation node ID updated on the generation event information storage unit 116A.

The generation event information transmission interval determination process of FIG. 18 and the module deployment process of FIG. 19 that is performed together with the generation event information transmission interval determination process as described above are described using a specific numerical example.

First, in step S301 of FIG. 18, one minute is designated as an initial value of the generation event information transmission interval. As a result, the generation event information is transmitted from the power sensors X and Y to the server node 110 every one minute. Accordingly, the storage contents of the generation event information storage unit 116A are the storage contents illustrated in FIG. 7. Every time the contents of the generation event information storage unit 116A are updated in units of one minute, the module deployment process of FIG. 19 is performed. As a result, as described above, in the example of FIG. 7, at a timing of 12:00:00-12:01:00 on Aug. 1, 2013 at which a first record of the generation event information is registered, the deployment of the module "power amount summation" to the power sensor X is performed. In addition, at a timing at which the generation node ID is changed to "power sensor Y" as a result of the registration of the generation event information of 12:10:00-12:11:00 on Aug. 1, 2013, the deployment of the module "power amount summation" to the power sensor Y is performed. As a result, the storage contents of the event reduction effect information storage unit 120A based on the event reduction effect information transmitted from the power sensors X and Y every one minute is the storage contents illustrated in FIG. 13. As a result, the contents of the output event data amount m1 totalized in step S304 of FIG. 18 are approximately 100 bytes/minute. In addition, the reception data amount d1 that is totalized in step S305 of FIG. 18 and is stored in the generation event information traffic storage unit 119 is also approximately 100 bytes/minute.

Then, in step S306 of FIG. 18, the generation event information transmission interval is set to two minutes. As a result, the generation event information is transmitted from the power sensors X and Y to the server node 110 every two minutes. Accordingly, the storage contents of the generation event information storage unit 116A are the storage contents illustrated in FIG. 20. Every time the contents of the generation event information storage unit 116A are updated in units of two minutes, the module deployment process of FIG. 19 is performed. As a result, as described above, in the example of FIG. 20, at a timing of 12:00:00-12:02:00 on Aug. 1, 2013 at which a first record of the generation event information is registered, the deployment of the module "power amount summation" to the power sensor X is performed. In addition, at a timing at which the generation node ID is changed to "power sensor Y" as a result of the registration of the generation event information of 12:10:00-12:12:00 on Aug. 1, 2013, the deployment of the module "power amount summation" to the power sensor Y is performed. As a result, the storage contents of the event reduction effect information storage unit 120A based on the event reduction effect information that is transmitted from the power sensors X and Y everyone minute are similar to the storage contents illustrated in FIG. 13 as described above. As a result, the contents of the output event data amount m2 totalized in step S309 of FIG. 18 are approximately 100 bytes/minute, which is similar to the contents in a case of a one-minute interval. In other words, even when the transmission interval of the generation event information is extended to two minutes, the transmission of the generation event information can follow a user of the user ID "User-A" that moves, for example, at ten-minute intervals, and therefore the output event data amount is not changed. In addition, the storage contents of the generation event information traffic storage unit 119 are 100 bytes at two-minute intervals, as illustrated in FIG. 21. As a result, the reception data amount d2 that is stored in the generation event information traffic storage unit 119 that is totalized in step S310 of FIG. 18 is approximately 50 byte/minute, which is half of the reception data amount in the one-minute interval case. In this state, in step S311 of FIG. 18, (m1+d1) before the change and (m2+d2) after the change are compared.

$m1+d1$=approximately 200 bytes/minute $m2+d2$=approximately 150 bytes/minute

Because the total traffic amount after the change is smaller and the two-minute transmission interval is more appropriate, the value after the change is used for a new generation event information transmission interval, and in step S312 of FIG. 18, m2 and d2 are respectively substituted for m1 and d1.

Subsequently, the generation event information transmission interval is extended to three minutes, four minutes, or the like, so as to further reduce the total traffic amount.

As a result of the repetition, in step S306 of FIG. 18, the generation event information transmission interval is set to ten minutes. As a result, the generation event information is transmitted from the power sensors X and Y to the server node 110 every ten minutes. Accordingly, the storage contents of the generation event information storage unit 116A are the storage contents illustrated in FIG. 22. Every time the contents of the generation event information storage unit 116A are updated in units of ten minutes, the module deployment process of FIG. 19 is performed. As a result, as described above, in the example of FIG. 22, at a timing of 12:00:00-12:10:00 on Aug. 1, 2013 at which a first record of the generation event information is registered, the deployment of the module "power amount summation" to the power sensor X is performed. In addition, at a timing at which the generation node ID is changed to "power sensor Y" as a result of the registration of the generation event information of 12:10:00-12:20:00 on Aug. 1, 2013, the deployment of the module "power amount summation" to the power sensor Y is performed. As a result, the storage contents of the event reduction effect information storage unit 120A based on the event reduction effect information that is transmitted from the power sensors X and Y every one minute are similar to the storage contents illustrated in FIG. 13 as described above. As a result, the contents of the output event data amount m2 that is totalized in step S309 of FIG. 18 are approximately 100 bytes/minutes, which is similar to the contents in the one-minute interval to the nine-minute interval cases. In other words, even when the transmission interval of the generation event information is extended to ten minutes, the transmission can follow a user of the user ID "User-A" that moves, for example, every ten minutes, and therefore the output event data amount is not changed. In addition, the storage contents of the generation event information traffic storage unit 119 are 100 bytes at ten-minute intervals, as illustrated in FIG. 23. As a result, the reception data amount d2 that is totalized in step S310 of FIG. 18 and is stored in the generation event information traffic storage unit 119 is approximately 10 bytes/minute, which is one tenth of the reception data amount in the one-minute interval case. In this state, in step S311 of FIG. 18, (m1+d1) before the change and (m2+d2) after the change are compared.

$m1+d1$=approximately (100+100/9) bytes/minute $m2+d2$=approximately (100+100/10) bytes/minute Because the total traffic amount after the change is smaller and the ten-minute transmission interval is more appropriate, the value after the change is used for a new generation event information transmission interval, and in step S312 of FIG. 18, m2 and d2 are respectively substituted for m1 and d1.

Further, in step S306 of FIG. 18, the generation event information transmission interval is set to eleven minutes. As a result, the generation event information is transmitted from the power sensors X and Y to the server node 110 every eleven minutes. Accordingly, the storage contents of the generation event information storage unit 116A are the storage contents illustrated in FIG. 24. Every time the contents of the generation event information storage unit 116A are updated in units of eleven minutes, the module deployment process of FIG. 19 is performed. In this case, as is understood from FIG. 24, during the same generation event collection period, generation event information relating to the same generation event aggregation attribute is transmitted from both of the power sensors X and Y. This is because a user of the user ID "User-A" moves every ten minutes and therefore the power consumption state is detected by both of the power sensors. Consequently, in step S208 of FIG. 17B, the module "power amount summation" is deployed not to the power sensors X and Y but to the server node 110. As a result, the storage contents of the event reduction effect information storage unit 120A based on the event reduction effect information that is transmitted from the power sensors X and Y every one minute are different from the storage contents illustrated in FIG. 13, and are the storage contents illustrated in FIG. 25. As a result, the contents of the output event data amount m2 that is totalized in step S309 of FIG. 18 are approximately 6000 bytes/minute, which is different from the contents in cases of one-minute to ten minutes intervals, and the reduction effect is greatly reduced. In other words, when the transmission interval of the generation event information is extended from ten minutes to eleven minutes, it is impossible for the transmission to follow a "User-A" that moves, for example, every ten minutes, and therefore the output event data amount is greatly changed. In addition, the storage contents of the generation event information traffic storage unit 119 are increased so as to be 6000 bytes at eleven-minute intervals. As a result, the reception data amount d2 that is totalized in step S310 of FIG. 18 and is stored in the generation event information traffic storage unit 119 is (6000/11) bytes/minute. In this state, in step S311 of FIG. 18, (m1+d1) before the change and (m2+d2) after the change are compared.

$m1+d1$=approximately (100+100/10) bytes/minute $m2+d2$=approximately (6000+6000/11) bytes/minute Because the total traffic amount before the change is smaller and a ten-minute transmission interval is more appropriate, in step S313 of FIG. 18, the generation event information transmission interval is restored from eleven minute to ten minutes, and ten minutes is determined to be a final generation event information transmission interval.

As described above, even when the event generation situation is changed with time (for example, when a node in which an event occurs is changed with time), the embodiments enable appropriately determining the transmission interval of the generation event information. In the determination, every time the transmission interval is changed, there is an advantage due to the traffic reduction effect by the distributed deployment of a module during each process period for each node, and a disadvantage, the collection costs needed for collecting generation events, are totalized and compared. As a result, an optimum transmission interval can be determined, and the efficiency of a distributed deployment process can be improved.

In the embodiments described above, the reception data amount at each reception time for each node is used for the collection cost needed for collecting generation events. In addition to this, as the collection cost, the movement cost of an instance, such as a halfway summation result, in redeploying a module, for example, from the power sensor X to the power sensor Y, may be considered. On this occasion, in the distributed deployment device, an instance movement cost calculating unit may be provided that calculates the movement cost of the instance associated with the module distributed deployment. Further, the event information transmission interval control unit may control the transmission interval of an event in a node in accordance with the movement cost of the instance calculated by the instance movement cost calculating unit, in addition to the traffic reduction amount and the collection cost. As a result, the transmission interval of the generation event information can be calculated more accurately.

In the embodiments above, the summation of the advantage due to the traffic reduction effect by the module distributed deployment and the disadvantage, collection costs needed for collecting the generation events, is performed as the following. Specifically, insteps S304 and S305 or steps S309 and S310 of FIG. 18, the summation is performed by calculating the total of the output event data amount on the event reduction effect information storage unit 120A and the reception data amount on the generation event information traffic storage unit 119. Alternatively, the summation of the advantage due to the traffic reduction effect by the module distributed deployment and the disadvantage, collection costs needed for collecting the generation events, may be performed using various values.

All examples and conditional language provided herein are intended for the pedagogical purposes of aiding the reader in understanding the invention and the concepts contributed by the inventor to furthering the art, and are not to be construed as limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A distributed deployment device that distributedly deploys a module that processes an event to a node, the distributed deployment device comprising:
   a memory; and
   a processor coupled to the memory and the processor configured to:
      collect the event from a sensor network that is coupled to a plurality of nodes, one or more of the nodes being sensor nodes that transmit an event corresponding to a sensing operation;
      collect a generation situation of the event in the node;
      determine a node of a deployment destination of the module in accordance with the generation situation of the event;
      collect a traffic reduction amount in the node of the deployment destination in a case in which distributed deployment of the module is controlled with respect to the node of the deployment destination;
      calculate a collection cost of the event from the node of the deployment destination; and
      control a transmission interval of the generation situation of the event in the node of the deployment destination in accordance with the traffic reduction amount and the collection cost.

2. The distributed deployment device according to claim 1, wherein
   the node of the deployment destination calculates and transmits the traffic reduction amount in the node of the deployment destination in a case in which the distributed deployment of the module is controlled, and
   the processor receives and stores, in the memory, the traffic reduction amount transmitted from the node of the deployment destination.

3. The distributed deployment device according to claim 1, wherein
   the processor calculates and stores, in the memory, traffic of the event that is collected from the node of the deployment destination by the distributed deployment device.

4. The distributed deployment device according to claim 1, wherein
   the processor calculates a movement cost of an instance associated with the distributed deployment of the module, and
   the processor controls the transmission interval of the event in the node of the deployment destination in accordance with the movement cost of the instance, in addition to the traffic reduction amount and the collection cost.

5. A distributed deployment system comprising a distributed deployment device coupled to a sensor network that is coupled to a plurality of nodes, one or more of the nodes being sensor nodes that transmits an event corresponding to a sensing operation and the distributed deployment device distributedly deploying a module that processes the event to a node, wherein the distributed deployment device performs:
   collecting the event from the sensor network;
   collecting a generation situation of the event in the node;
   determining a node of a deployment destination of the module that processes the event in accordance with the generation situation of the event;
   distributedly deploying the module that processes the event to the node of the deployment destination;
   collecting, from the node of the deployment destination, a traffic reduction amount in the node of the deployment destination in a case in which distributed deployment of the module is controlled with respect to the node of the deployment destination;
   calculating collection cost of the event from the node of the deployment destination; and
   controlling a transmission interval of the generation situation of the event in the node of the deployment destination in accordance with the traffic reduction amount and the collection cost.

6. A non-transitory computer-readable recording medium having stored therein a program for causing a processor included in a distributed deployment device that distributedly deploys a module that processes an event to a node to execute a distributed deployment process, the process comprising:

collecting an event corresponding to a sensing operation from a sensor network that is coupled to a plurality of nodes, one or more of the nodes being sensor nodes that transmits the event;

collecting a generation situation of the event in the node;

determining a node of a deployment destination of the module in accordance with the generation situation of the event;

collecting a traffic reduction amount in the node of the deployment destination in a case in which distributed deployment of the module is controlled with respect to the node of the deployment destination;

calculating a collection cost of the event from the node of the deployment destination; and controlling a transmission interval of the generation situation of the event in the node of the deployment destination in accordance with the traffic reduction amount that the collecting of the traffic reduction amount has collected and the collection cost that the calculating of the event collection cost has calculated.

7. A distributed deployment method that is performed by a processor of a distributed deployment device that distributedly deploys a module that processes an event to a node, wherein the processor performs:

collecting an event corresponding to a sensing operation from a sensor network that is coupled to a plurality of nodes, one or more of the nodes being sensor nodes that transmits the event;

collecting a generation situation of the event in the node;

determining a node of a deployment destination of the module in accordance with the generation situation of the event;

collecting a traffic reduction amount in the node of the deployment destination in a case in which distributed deployment of the module is controlled with respect to the node of the deployment destination;

calculating a collection cost of the event from the node of the deployment destination; and controlling a transmission interval of the generation situation of the event in the node of the deployment destination in accordance with the traffic reduction amount and the collection cost.

* * * * *